US012803758B2

(12) United States Patent
Wang et al.

(10) Patent No.: US 12,803,758 B2
(45) Date of Patent: Nov. 17, 2026

(54) DAI IN UPLINK INDICATION METHOD, DEVICE AND STORAGE MEDIUM

(71) Applicant: DATANG MOBILE COMMUNICATIONS EQUIPMENT CO., LTD., Beijing (CN)

(72) Inventors: Junwei Wang, Beijing (CN); Xuejuan Gao, Beijing (CN); Qianqian Si, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 427 days.

(21) Appl. No.: 18/572,775

(22) PCT Filed: Jun. 21, 2022

(86) PCT No.: PCT/CN2022/100071
§ 371 (c)(1),
(2) Date: Dec. 20, 2023

(87) PCT Pub. No.: WO2023/273951
PCT Pub. Date: Jan. 5, 2023

(65) Prior Publication Data

US 2024/0291621 A1 Aug. 29, 2024

(30) Foreign Application Priority Data

Jun. 29, 2021 (CN) ......................... 202110724509.0
Feb. 24, 2022 (CN) ......................... 202210178356.9

(51) Int. Cl.
*H04L 5/00* (2006.01)
*H04L 1/1867* (2023.01)
*H04L 1/1812* (2023.01)

(52) U.S. Cl.
CPC .......... *H04L 5/0055* (2013.01); *H04L 1/1887* (2013.01); *H04L 1/1896* (2013.01); *H04L 1/1812* (2013.01)

(58) Field of Classification Search
CPC ... H04L 5/0055; H04L 1/1887; H04L 1/1896; H04L 1/1812
See application file for complete search history.

(56) References Cited

U.S. PATENT DOCUMENTS

2016/0269104 A1* 9/2016 Lee .......................... H04J 11/00
2020/0106566 A1 4/2020 Yeo et al.

(Continued)

FOREIGN PATENT DOCUMENTS

CN 110876204 A 3/2020
CN 111740807 A 10/2020

(Continued)

OTHER PUBLICATIONS

State Intellectual Property Office of the People's Republic of China, Notice of Allowance Issued in Application No. 202210178356.9, Apr. 29, 2024, 7 pages.

(Continued)

*Primary Examiner* — Samina F Choudhry
(74) *Attorney, Agent, or Firm* — Kilpatrick Townsend & Stockton LLP

(57) ABSTRACT

The present disclosure provides a DAI in uplink indication method, a device and a storage medium. The number of DAI in uplink configured by a network device for broadcast (Continued)

multicast services is acquired; a corresponding relationship between a HARQ-ACK sub-codebook of each broadcast multicast service and each DAI in uplink is determined; a length of a corresponding HARQ-ACK sub-codebook is determined according to the corresponding relationship and scheduling signaling received from the network device for a broadcast multicast service. According to the embodiments of the present disclosure, there is no need to configure DAI in uplink according to the maximum number of broadcast multicast services or the maximum number of possibly generated HARQ-ACK sub-codebooks, but the purpose of determining the length of a HARQ-ACK sub-codebook can still be achieved, thus scheduling flexibility of the network device can be improved, and signaling overheads of the DAI in uplink can be reduced.

12 Claims, 7 Drawing Sheets

(56) References Cited

U.S. PATENT DOCUMENTS

| | | | | |
|---|---|---|---|---|
| 2021/0092759 | A1 | 3/2021 | Xiong et al. | |
| 2022/0303892 | A1* | 9/2022 | Awadin | H04W 52/0216 |

FOREIGN PATENT DOCUMENTS

| | | | | |
|---|---|---|---|---|
| CN | 112042142 | A | 12/2020 | |
| CN | 112087288 | A | 12/2020 | |
| WO | WO-2021101251 | A1 * | 5/2021 | H04W 72/23 |
| WO | WO-2021223153 | A1 * | 11/2021 | H04L 12/1868 |
| WO | 2022211480 | A1 | 10/2022 | |

OTHER PUBLICATIONS

RAN1 Chair's Notes, 3GPP TSG RAN WG1 Meeting #104b-e, e-Meeting, Apr. 12-20, 2021, total 128 pages.

Moderator (Huawei),"FL summary#1 on improving reliability for MBS for RRC_Connected UEs", 3GPP TSG RAN WG1 Meeting #104bis-e, E-meeting, Apr. 12-20, 2021, total 44 pages, R1-2103834.

Notice of Allowance of Corresponding CN Patent Application No. 202410873129.7 dated Sep. 15, 2025.

ISA State Intellectual Property Office of the People's Republic of China, International Search Report and written opinion Issued in Application No. PCT/CN2022/100071, Sep. 14, 2022, WIPO, 15 pages.

ZTE,"Discussion on mechanisms to Improve Reliability for RRC_Connected UEs", 3GPP TSG RAN WG1 #104b-e, e-Meeting, Apr. 12-20, 2021, total 11 pages, R1-2102502.

CATT et al.,"Discussion on reliability improvement mechanism for RRC_Connected UEs in MBS", 3GPP TSG RAN WG1 #105-e, e-Meeting, May 19-27, 2021, total 10 pages, R1-2104492.

European Patent Office, Extended European Search Report Issued in Application No. 22831769.9, Aug. 28, 2024, Germany, 16 pages.

CMCC,"Discussion on reliability improvement", 3GPP TSG RAN WG1 #104b-e, e-Meeting, Apr. 12-20, 2021, total 9 pages, R1-2102901.

ZTE,"Discussion on mechanisms to Improve Reliability for RRC_Connected UEs", 3GPP TSG RAN WG1 #105-e, e-Meeting, May 10-27, 2021, total 14 pages, R1-2104337.

Vivo,"Discussion on mechanisms to improve reliability for RRC_Connected UEs", 3GPP TSG RAN WG1 #105-e, e-Meeting, May 10-27, 2021, total 7 pages, R1-2104388.

Japanese Patent Office, Office Action Issued in counterpart Application No. 2023-580576, Dec. 2, 2024, 9 pages.

Huawei et al.,"PDSCH/PUSCH enhancements for 52-71GHz spectrum", 3GPP TSG RAN WG1 Meeting #105-e, E-meeting, May 10-27, 2021, total 10 pages, R1-2104274.

* cited by examiner

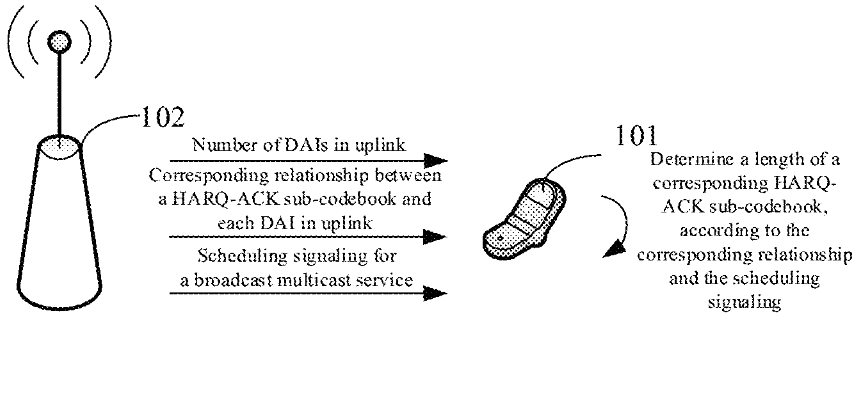

FIG. 1c

S201

Acquire the number of DAIs in uplink configured by a network device for a broadcast multicast service

S202

Determine a corresponding relationship between a HARQ-ACK sub-codebook of each broadcast multicast service and each DAI in uplink

S203

Determine a length of a corresponding HARQ-ACK sub-codebook, according to the corresponding relationship and the scheduling signaling for the broadcast multicast service received from the network device

FIG. 2

DAI IN UPLINK INDICATION METHOD, DEVICE AND STORAGE MEDIUM

CROSS-REFERENCE TO RELATED APPLICATIONS

This disclosure is a National Stage of International Application No. PCT/CN2022/100071, filed on Jun. 21, 2022, which claims priority to Chinese patent application No. 202110724509.0 titled "DAI IN UPLINK INDICATION METHOD, DEVICE AND STORAGE MEDIUM" and filed with the China National Intellectual Property Administration on Jun. 29, 2021, and claims priority to Chinese patent application No. 202210178356.9 titled "DAI IN UPLINK INDICATION METHOD, DEVICE AND STORAGE MEDIUM" and filed with the China National Intellectual Property Administration on Feb. 24, 2022. Both of the aforementioned applications are hereby incorporated by reference in their entireties.

FIELD

The present disclosure relates to the field of communication technology, and in particular, to a DAI in uplink indication method, a device and a storage medium.

BACKGROUND

In the NR R17 MBS standard, dynamic (type-2) feedback of a broadcast multicast service HARQ-ACK (Hybrid Automatic Repeat Request-acknowledgement) codebook is supported. When a terminal receives multiple broadcast multicast services, a base station configures multiple G-RNTIs (Group common Radio Network Temporary Identifiers) for the terminal, to identify different broadcast multicast services. For type-2 codebook generation, DAI (DownLink Assignment Index) counting is performed for different broadcast multicast services respectively, and respective HARQ-ACK sub-codebooks are generated, which will cause the terminal to generate multiple HARQ-ACK sub-codebooks of the broadcast multicast services at the same time.

When the multiple HARQ-ACK sub-codebooks are multiplexed on a PUSCH (Physical Uplink Shared Channel), scheduling signaling of the PUSCH may carry an uplink DAI (UL DAI) which is used to indicate count information of one or more HARQ-ACK sub-codebooks. When the terminal generates multiple HARQ-ACK sub-codebooks due to the broadcast multicast services, each broadcast multicast service needs to be configured with a DAI in uplink, which increases overheads of the scheduling signaling.

SUMMARY

The present disclosure provides a DAI in uplink indication method, a device and a storage medium, to reduce signaling overheads of DAIs in uplink.

In one embodiment of the present disclosure provides a DAI in uplink indication method, applied to a terminal, including:

- acquiring the number of DAIs in uplink configured by a network device for broadcast multicast services;
- determining a corresponding relationship between a HARQ-ACK sub-codebook of each broadcast multicast service and each DAI in uplink;
- determining a length of a corresponding HARQ-ACK sub-codebook, according to the corresponding relationship and scheduling signaling received from the network device for a broadcast multicast service.

In one embodiment, the acquiring the number of DAIs in uplink configured by the network device for the broadcast multicast services includes:

- acquiring the number of broadcast multicast services and a preset threshold value configured by the network device;
- determining the number of DAIs in uplink according to the number of broadcast multicast services and the preset threshold value.

In one embodiment, the determining the number of DAIs in uplink according to the number of broadcast multicast services and the preset threshold value includes:

- if the number of broadcast multicast services is less than or equal to the preset threshold value, determining that the number of DAIs in uplink is equal to the number of broadcast multicast services; or
- if the number of broadcast multicast services is greater than the preset threshold value, determining that the number of DAIs in uplink is equal to the preset threshold value.

In one embodiment, the determining the number of DAIs in uplink according to the number of broadcast multicast services and the preset threshold value includes:

- acquiring a ratio of the number of broadcast multicast services to the preset threshold value, rounding the ratio, and determining a rounded result as the number of DAIs in uplink.

In one embodiment, the acquiring the number of DAIs in uplink preset by the network device for the broadcast multicast service includes:

- acquiring a preset value configured by the network device, and determining the preset value as the number of DAIs in uplink.

In one embodiment, the determining the corresponding relationship between the HARQ-ACK sub-codebook of each broadcast multicast service and each DAI in uplink includes:

- determining, according to an identifier G-RNTI of each broadcast multicast service, a corresponding relationship between each G-RNTI and each DAI in uplink;
- determining a corresponding relationship between a HARQ-ACK sub-codebook of a broadcast multicast service corresponding to each G-RNTI and each DAI in uplink, according to the corresponding relationship between each G-RNTI and each DAI in uplink.

In one embodiment, the determining, according to the identifier G-RNTI of each broadcast multicast service, the corresponding relationship between each G-RNTI and each DAI in uplink includes:

- performing a modulo operation on each G-RNTI to the number of DAIs in uplink, determine G-RNTIs with a same modulo result as a G-RNTI group, and establishing a corresponding relationship between the G-RNTI group and a DAI in uplink having a sequence number equal to the modulo result.

In one embodiment, the determining, according to the identifier G-RNTI of each broadcast multicast service, the corresponding relationship between each G-RNTI and each DAI in uplink includes:

- determining the corresponding relationship between each G-RNTI and each DAI in uplink according to high-layer signaling sent by the network device received in advance, where the high-layer signaling includes the corresponding relationship between each G-RNTI and each DAI in uplink preset by the network device when pre-configuring the broadcast multicast service.

In one embodiment, the method further includes:

if for any broadcast multicast service, the high-layer signaling does not include the corresponding relationship between the G-RNTI of the broadcast multicast service and each DAI in uplink, determining the length of the corresponding HARQ-ACK sub-codebook according to a DAI in downlink included in a last piece of scheduling signaling received for the broadcast multicast service.

In one embodiment, the determining, according to the identifier G-RNTI of each broadcast multicast service, the corresponding relationship between each G-RNTI and each DAI in uplink includes:

receiving scheduling signaling sent by the network device for any one or more broadcast multicast services, where the scheduling signaling includes indication information, the indication information is used to indicate a DAI in uplink corresponding to a G-RNTI of one or more broadcast multicast services scheduled currently;

determining the corresponding relationship between each G-RNTI and each DAI in uplink according to the indication information of the scheduling signaling.

In one embodiment, the determining the corresponding relationship between each G-RNTI and each DAI in uplink according to the scheduling signaling includes:

if for a same HARQ-ACK sub-codebook of any broadcast multicast service, plural pieces of scheduling signaling sent by the network device are received, and indication information in each piece of scheduling signaling indicates a different DAI in uplink corresponding to the G-RNTI of the one or more broadcast multicast services scheduled currently, determining a corresponding relationship between the G-RNTI of the one or more broadcast multicast services scheduled currently and the DAI in uplink, based on indication information of a last piece of scheduling signaling.

In one embodiment, the determining the corresponding relationship between each G-RNTI and each DAI in uplink according to the scheduling signaling includes:

if the scheduling signaling does not indicate the DAI in uplink corresponding to the G-RNTI of the one or more broadcast multicast services scheduled currently, corresponding the G-RNTI of the one or more broadcast multicast services scheduled currently to a default DAI in uplink; or where the method further includes:

if the scheduling signaling does not indicate the DAI in uplink corresponding to the G-RNTI of the one or more broadcast multicast services scheduled currently, determining the length of the corresponding HARQ-ACK sub-codebook according to a DAI in downlink included in a last piece of scheduling signaling received for the broadcast multicast service.

In one embodiment, the determining, according to the identifier G-RNTI of each broadcast multicast service, the corresponding relationship between each G-RNTI and each DAI in uplink includes:

receiving scheduling signaling sent by the network device for the broadcast multicast service;

for one or more broadcast multicast services scheduled currently, establishing a corresponding relationship between a G-RNTI of the one or more broadcast multicast services scheduled currently and each DAI in uplink sequentially in a predetermined order of the G-RNTI.

In one embodiment, establishing the corresponding relationship between the G-RNTI of the one or more broadcast multicast services scheduled currently and each DAI in uplink sequentially in the predetermined order of G-RNTI includes:

establishing the corresponding relationship between the G-RNTI of the one or more broadcast multicast services scheduled currently and each DAI in uplink sequentially, in an ascending order or a descending order of the G-RNTI of the one or more broadcast multicast services scheduled currently.

In one embodiment, the determining the length of the corresponding HARQ-ACK sub-codebook, according to the corresponding relationship and the scheduling signaling received from the network device for the broadcast multicast service includes:

determining a value of each DAI in uplink according to the corresponding relationship and uplink DAI information included in the scheduling signaling;

determining, according to the value of each DAI in uplink, a length of a HARQ-ACK sub-codebook scheduled currently corresponding to each DAI in uplink.

In one embodiment, the determining, according to the value of each DAI in uplink, the length of the HARQ-ACK sub-codebook scheduled currently corresponding to each DAI in uplink includes:

for any DAI in uplink, determining whether to feedback the corresponding HARQ-ACK sub-codebook, according to a value of the DAI in uplink and whether scheduling signaling for scheduling each broadcast multicast service corresponding to the DAI in uplink is received;

if it is determined not to feedback the corresponding HARQ-ACK sub-codebook, determining that the length of the corresponding HARQ-ACK sub-codebook scheduled currently is 0; or if it is determined to feedback the corresponding HARQ-ACK sub-codebook, determining, according to the value of the DAI in uplink, the length of the corresponding HARQ-ACK sub-codebook scheduled currently.

In one embodiment, the determining the length of the corresponding HARQ-ACK sub-codebook, according to the corresponding relationship and the scheduling signaling received from the network device for the broadcast multicast service includes:

if the scheduling signaling does not include uplink DAI information corresponding to the HARQ-ACK sub-codebook scheduled currently, determining, according to a DAI in downlink included in the scheduling signaling, the length of the HARQ-ACK sub-codebook scheduled currently.

In one embodiment, the method further includes:

determining a length of a HARQ-ACK codebook according to a length of each HARQ-ACK sub-codebook.

In one embodiment of the present disclosure provides a DAI in uplink indication method, applied to a network device, including:

acquiring the number of DAIs in uplink for broadcast multicast services;

determining a corresponding relationship between a HARQ-ACK sub-codebook of each broadcast multicast service and each DAI in uplink;

determining a length of a corresponding HARQ-ACK sub-codebook, according to the corresponding relationship and scheduling signaling sent to a terminal for a broadcast multicast service; and/or sending the scheduling signaling for the broadcast multicast service to the terminal, to make the terminal determine the length of the corresponding HARQ-ACK sub-codebook according to the corresponding relationship and the scheduling signaling.

In one embodiment, the acquiring the number of DAIs in uplink for the broadcast multicast service includes:

acquiring the number of broadcast multicast services and a preset threshold value; determining the number of DAIs in uplink according to the number of broadcast multicast services and the preset threshold value.

In one embodiment, the determining the number of DAIs in uplink according to the number of broadcast multicast services and the preset threshold value includes:

if the number of broadcast multicast services is less than or equal to the preset threshold value, determining that the number of DAIs in uplink is equal to the number of broadcast multicast services; or if the number of broadcast multicast services is greater than the preset threshold value, determining that the number of DAIs in uplink is equal to the preset threshold value.

In one embodiment, the determining the number of DAIs in uplink according to the number of broadcast multicast services and the preset threshold value includes:

acquiring a ratio of the number of broadcast multicast services to the preset threshold value, rounding the ratio, and determining a rounded result as the number of DAIs in uplink.

In one embodiment, the acquiring the number of DAIs in uplink for the broadcast multicast service includes:

acquiring a preset value, and determine the preset value as the number of DAIs in uplink.

In one embodiment, the determining the corresponding relationship between the HARQ-ACK sub-codebook of each broadcast multicast service and each DAI in uplink includes:

determining, according to an identifier G-RNTI of each broadcast multicast service, a corresponding relationship between each G-RNTI and each DAI in uplink;

determining a corresponding relationship between a HARQ-ACK sub-codebook of a broadcast multicast service corresponding to each G-RNTI and each DAI in uplink, according to the corresponding relationship between each G-RNTI and each DAI in uplink.

In one embodiment, the determining, according to the identifier G-RNTI of each broadcast multicast service, the corresponding relationship between each G-RNTI and each DAI in uplink includes:

performing a modulo operation on each G-RNTI to the number of DAIs in uplink, determine G-RNTIs with a same modulo result as a G-RNTI group, and establishing a corresponding relationship between the G-RNTI group and a DAI in uplink having a sequence number equal to the modulo result.

In one embodiment, the determining, according to the identifier G-RNTI of each broadcast multicast service, the corresponding relationship between each G-RNTI and each DAI in uplink includes:

acquiring high-layer signaling sent to the terminal, where the high-layer signaling includes a corresponding relationship between each G-RNTI and each DAI in uplink preset by the network device when pre-configuring the broadcast multicast service;

determining, according to the high-layer signaling, the corresponding relationship between each G-RNTI and each DAI in uplink.

In one embodiment, the method further includes:

if for any broadcast multicast service, the high-layer signaling does not include the corresponding relationship between the G-RNTI of the broadcast multicast service and each DAI in uplink, determining the length of the corresponding HARQ-ACK sub-codebook according to a DAI in downlink included in the scheduling signaling sent to the terminal for the broadcast multicast service.

In one embodiment, the determining, according to the identifier G-RNTI of each broadcast multicast service, the corresponding relationship between each G-RNTI and each DAI in uplink includes:

acquiring scheduling signaling sent to the terminal for any one or more broadcast multicast services, where the scheduling signaling includes indication information, the indication information is used to indicate a DAI in uplink corresponding to a G-RNTI of one or more broadcast multicast services scheduled currently;

determining the corresponding relationship between each G-RNTI and each DAI in uplink according to the indication information of the scheduling signaling.

In one embodiment, the determining the corresponding relationship between each G-RNTI and each DAI in uplink according to the scheduling signaling includes:

if for a same HARQ-ACK sub-codebook of any broadcast multicast service, plural pieces of scheduling signaling need to be sent to the terminal, and indication information in each piece of scheduling signaling indicates a different DAI in uplink corresponding to the G-RNTI of the one or more broadcast multicast services scheduled currently, determining a corresponding relationship between the G-RNTI of the one or more broadcast multicast services scheduled currently and the DAI in uplink, based on indication information of a last piece of scheduling signaling.

In one embodiment, the determining the corresponding relationship between each G-RNTI and each DAI in uplink according to the scheduling signaling includes:

if the scheduling signaling does not indicate the DAI in uplink corresponding to the G-RNTI of the one or more broadcast multicast services scheduled currently, corresponding the G-RNTI of the one or more broadcast multicast services scheduled currently to a default DAI in uplink; or where the method further includes:

if the scheduling signaling does not indicate the DAI in uplink corresponding to the G-RNTI of the one or more broadcast multicast services scheduled currently, determining the length of the corresponding HARQ-ACK sub-codebook according to a DAI in downlink included in a last piece of scheduling signaling received for the broadcast multicast service.

In one embodiment, the determining, according to the identifier G-RNTI of each broadcast multicast service, the corresponding relationship between each G-RNTI and each DAI in uplink includes:

acquiring scheduling signaling sent to the terminal for the broadcast multicast service;

for one or more broadcast multicast services scheduled currently, establishing a corresponding relationship between a G-RNTI of the one or more broadcast multicast services scheduled currently and each DAI in uplink sequentially in a predetermined order of the G-RNTI.

In one embodiment, establishing the corresponding relationship between the G-RNTI of the one or more broadcast multicast services scheduled currently and each DAI in uplink sequentially in the predetermined order of G-RNTI includes:

establishing the corresponding relationship between the G-RNTI of the one or more broadcast multicast services scheduled currently and each DAI in uplink sequentially in an ascending order or a descending order of the G-RNTI of the one or more broadcast multicast services scheduled currently.

In one embodiment, the determining the length of the corresponding HARQ-ACK sub-codebook, according to the corresponding relationship and the scheduling signaling sent to the terminal for the broadcast multicast service includes:

determining a value of each DAI in uplink according to the corresponding relationship and uplink DAI information included in the scheduling signaling;

determining, according to the value of each DAI in uplink, a length of a HARQ-ACK sub-codebook scheduled currently corresponding to each DAI in uplink.

In one embodiment, the determining, according to the value of each DAI in uplink, the length of the HARQ-ACK sub-codebook scheduled currently corresponding to each DAI in uplink includes:

for any DAI in uplink, determining whether the terminal feeds back the corresponding HARQ-ACK sub-codebook, according to a value of the DAI in uplink and whether to send scheduling signaling for scheduling each broadcast multicast service corresponding to the DAI in uplink to the terminal;

if it is determined that the terminal does not feedback the corresponding HARQ-ACK sub-codebook, determining that the length of the corresponding HARQ-ACK sub-codebook scheduled currently is 0; or if it is determined that the terminal feeds back the corresponding HARQ-ACK sub-codebook, determining, according to the value of the DAI in uplink, the length of the corresponding HARQ-ACK sub-codebook scheduled currently.

In one embodiment, the determining the length of the corresponding HARQ-ACK sub-codebook, according to the corresponding relationship and the scheduling signaling sent to the terminal for the broadcast multicast service includes:

if the scheduling signaling does not include uplink DAI information corresponding to the HARQ-ACK sub-codebook scheduled currently, determining, according to a DAI in downlink included in the scheduling signaling, the length of the HARQ-ACK sub-codebook scheduled currently.

In one embodiment, the method further includes:

determining a length of a HARQ-ACK codebook according to a length of each HARQ-ACK sub-codebook.

In one embodiment of the disclosure provides a terminal, including a memory, a transceiver, and a processor:

where the memory is configured to store a computer program; the transceiver is configured to send and receive data under control of the processor; and the processor is configured to read the computer program in the memory and execute following operations:

acquiring the number of DAIs in uplink configured by a network device for broadcast multicast services;

determining a corresponding relationship between a HARQ-ACK sub-codebook of each broadcast multicast service and each DAI in uplink;

determining a length of a corresponding HARQ-ACK sub-codebook, according to the corresponding relationship and scheduling signaling received from the network device for a broadcast multicast service.

In one embodiment, the processor, when acquiring the number of DAIs in uplink configured by the network device for the broadcast multicast services, is configured to:

acquire the number of broadcast multicast services and a preset threshold value configured by the network device;

determine the number of DAIs in uplink according to the number of broadcast multicast services and the preset threshold value.

In one embodiment, the processor, when determining the number of DAIs in uplink according to the number of broadcast multicast services and the preset threshold value, is configured to:

if the number of broadcast multicast services is less than or equal to the preset threshold value, determine that the number of DAIs in uplink is equal to the number of broadcast multicast services; or if the number of broadcast multicast services is greater than the preset threshold value, determine that the number of DAIs in uplink is equal to the preset threshold value.

In one embodiment, the processor, when determining the number of DAIs in uplink according to the number of broadcast multicast services and the preset threshold value, is configured to:

acquire a ratio of the number of broadcast multicast services to the preset threshold value, round the ratio, and determine a rounded result as the number of DAIs in uplink.

In one embodiment, the processor, when acquiring the number of DAIs in uplink preset by the network device for the broadcast multicast service, is configured to:

acquire a preset value configured by the network device, and determine the preset value as the number of DAIs in uplink.

In one embodiment, the processor, when determining the corresponding relationship between the HARQ-ACK sub-codebook of each broadcast multicast service and each DAI in uplink, is configured to:

determine, according to an identifier G-RNTI of each broadcast multicast service, a corresponding relationship between each G-RNTI and each DAI in uplink;

determine a corresponding relationship between a HARQ-ACK sub-codebook of a broadcast multicast service corresponding to each G-RNTI and each DAI in uplink, according to the corresponding relationship between each G-RNTI and each DAI in uplink.

In one embodiment, when determining, according to the identifier G-RNTI of each broadcast multicast service, the corresponding relationship between each G-RNTI and each DAI in uplink, the processor is configured to:

perform a modulo operation on each G-RNTI to the number of DAIs in uplink, determine G-RNTIs with a same modulo result as a G-RNTI group, and establish a corresponding relationship between the G-RNTI group and a DAI in uplink having a sequence number equal to the modulo result.

In one embodiment, when determining, according to the identifier G-RNTI of each broadcast multicast service, the corresponding relationship between each G-RNTI and each DAI in uplink, the processor is configured to:

determine the corresponding relationship between each G-RNTI and each DAI in uplink according to high-layer signaling sent by the network device received in advance, where the high-layer signaling includes the corresponding relationship between each G-RNTI and each DAI in uplink preset by the network device when pre-configuring the broadcast multicast service.

In one embodiment, the processor is further configured to:

if for any broadcast multicast service, the high-layer signaling does not include the corresponding relationship between the G-RNTI of the broadcast multicast service and each DAI in uplink, determine the length of the corresponding HARQ-ACK sub-codebook according to a DAI in downlink included in a last piece of scheduling signaling received for the broadcast multicast service.

In one embodiment, when determining, according to the identifier G-RNTI of each broadcast multicast service, the corresponding relationship between each G-RNTI and each DAI in uplink, the processor is configured to:

receive scheduling signaling sent by the network device for any one or more broadcast multicast services, where the scheduling signaling includes indication information, the indication information is used to indicate a DAI in uplink corresponding to a G-RNTI of one or more broadcast multicast services scheduled currently;

determine the corresponding relationship between each G-RNTI and each DAI in uplink according to the indication information of the scheduling signaling.

In one embodiment, the processor, when determining the corresponding relationship between each G-RNTI and each DAI in uplink according to the scheduling signaling, is configured to:

if for a same HARQ-ACK sub-codebook of any broadcast multicast service, plural pieces of scheduling signaling sent by the network device are received, and indication information in each piece of scheduling signaling indicates a different DAI in uplink corresponding to the G-RNTI of the one or more broadcast multicast services scheduled currently, determine a corresponding relationship between the G-RNTI of the one or more broadcast multicast services scheduled currently and the DAI in uplink, based on indication information of a last piece of scheduling signaling.

In one embodiment, the processor, when determining the corresponding relationship between each G-RNTI and each DAI in uplink according to the scheduling signaling, is configured to:

if the scheduling signaling does not indicate the DAI in uplink corresponding to the G-RNTI of the one or more broadcast multicast services scheduled currently, correspond the G-RNTI of the one or more broadcast multicast services scheduled currently to a default DAI in uplink; or the processor is further configured to:

if the scheduling signaling does not indicate the DAI in uplink corresponding to the G-RNTI of the one or more broadcast multicast services scheduled currently, determine the length of the corresponding HARQ-ACK sub-codebook according to a DAI in downlink included in a last piece of scheduling signaling received for the broadcast multicast service.

In one embodiment, when determining, according to the identifier G-RNTI of each broadcast multicast service, the corresponding relationship between each G-RNTI and each DAI in uplink, the processor is configured to:

receive scheduling signaling sent by the network device for the broadcast multicast service;

for one or more broadcast multicast services scheduled currently, establish a corresponding relationship between a G-RNTI of the one or more broadcast multicast services scheduled currently and each DAI in uplink sequentially in a predetermined order of the G-RNTI.

In one embodiment, the processor, when establishing the corresponding relationship between the G-RNTI of the one or more broadcast multicast services scheduled currently and each DAI in uplink sequentially in the predetermined order of G-RNTI, is configured to:

establish the corresponding relationship between the G-RNTI of the one or more broadcast multicast services scheduled currently and each DAI in uplink sequentially, in an ascending order or a descending order of the G-RNTI of the one or more broadcast multicast services scheduled currently.

In one embodiment, the processor, when determining a length of a corresponding HARQ-ACK sub-codebook according to the corresponding relationship and the scheduling signaling received from the network device for the broadcast multicast service, is configured to:

determine a value of each DAI in uplink according to the corresponding relationship and uplink DAI information included in the scheduling signaling;

determine, according to the value of each DAI in uplink, a length of a HARQ-ACK sub-codebook scheduled currently corresponding to each DAI in uplink.

In one embodiment, the processor, when determining, according to the value of each DAI in uplink, the length of the HARQ-ACK sub-codebook scheduled currently corresponding to each DAI in uplink, is configured to:

for any DAI in uplink, determine whether to feedback the corresponding HARQ-ACK sub-codebook, according to a value of the DAI in uplink and whether scheduling signaling for scheduling each broadcast multicast service corresponding to the DAI in uplink is received;

if it is determined not to feedback the corresponding HARQ-ACK sub-codebook, determine that the length of the corresponding HARQ-ACK sub-codebook scheduled currently is 0; or if it is determined to feedback the corresponding HARQ-ACK sub-codebook, determine, according to the value of the DAI in uplink, the length of the corresponding HARQ-ACK sub-codebook scheduled currently.

In one embodiment, the processor, when determining a length of a corresponding HARQ-ACK sub-codebook, according to the corresponding relationship and the scheduling signaling received from the network device for the broadcast multicast service is configured to:

if the scheduling signaling does not include uplink DAI information corresponding to the HARQ-ACK sub-codebook scheduled currently, determine, according to a DAI in downlink included in the scheduling signaling, the length of the HARQ-ACK sub-codebook scheduled currently.

In one embodiment, the processor is further configured to:

determine a length of a HARQ-ACK codebook according to a length of each HARQ-ACK sub-codebook.

In one embodiment of the present disclosure provides a network device, including a memory, a transceiver, and a processor:

where the memory is configured to store a computer program; the transceiver is configured to send and receive data under control of the processor; and the processor is configured to read the computer program in the memory and execute following operations:

acquiring the number of DAIs in uplink for broadcast multicast services;

determining a corresponding relationship between a HARQ-ACK sub-codebook of each broadcast multicast service and each DAI in uplink;

determining a length of a corresponding HARQ-ACK sub-codebook, according to the corresponding relationship and scheduling signaling sent to a terminal for a broadcast multicast service; and/or send the scheduling signaling for the broadcast multicast service to the terminal, to make the terminal determine the length of the corresponding HARQ-ACK sub-codebook according to the corresponding relationship and the scheduling signaling.

In one embodiment, the processor, when acquiring the number of DAIs in uplink for the broadcast multicast services, is configured to:

acquire the number of broadcast multicast services and a preset threshold value; determine the number of DAIs in uplink according to the number of broadcast multicast services and the preset threshold value.

In one embodiment, the processor, when determining the number of DAIs in uplink according to the number of broadcast multicast services and the preset threshold value, is configured to:

if the number of broadcast multicast services is less than or equal to the preset threshold value, determine that the number of DAIs in uplink is equal to the number of broadcast multicast services; or if the number of broadcast multicast services is greater than the preset threshold value, determine that the number of DAIs in uplink is equal to the preset threshold value.

In one embodiment, the processor, when determining the number of DAIs in uplink according to the number of broadcast multicast services and the preset threshold value, is configured to:

acquire a ratio of the number of broadcast multicast services to the preset threshold value, round the ratio, and determining a rounded result as the number of DAIs in uplink.

In one embodiment, the processor, when acquiring the number of DAIs in uplink for the broadcast multicast services, is configured to:

acquire a preset value, and determine the preset value as the number of DAIs in uplink.

In one embodiment, the processor, when determining the corresponding relationship between the HARQ-ACK sub-codebook of each broadcast multicast service and each DAI in uplink, is configured to:

determine, according to an identifier G-RNTI of each broadcast multicast service, a corresponding relationship between each G-RNTI and each DAI in uplink;

determine a corresponding relationship between a HARQ-ACK sub-codebook of a broadcast multicast service corresponding to each G-RNTI and each DAI in uplink, according to the corresponding relationship between each G-RNTI and each DAI in uplink.

In one embodiment, when determining, according to the identifier G-RNTI of each broadcast multicast service, the corresponding relationship between each G-RNTI and each DAI in uplink, the processor is configured to:

perform a modulo operation on each G-RNTI to the number of DAIs in uplink, determine G-RNTIs with a same modulo result as a G-RNTI group, and establish a corresponding relationship between the G-RNTI group and a DAI in uplink having a sequence number equal to the modulo result.

In one embodiment, when determining, according to the identifier G-RNTI of each broadcast multicast service, the corresponding relationship between each G-RNTI and each DAI in uplink, the processor is configured to:

acquire high-layer signaling sent to the terminal, where the high-layer signaling includes a corresponding relationship between each G-RNTI and each DAI in uplink preset by the network device when pre-configuring the broadcast multicast service;

determine, according to the high-layer signaling, the corresponding relationship between each G-RNTI and each DAI in uplink.

In one embodiment, the processor is further configured to:

if for any broadcast multicast service, the high-layer signaling does not include the corresponding relationship between the G-RNTI of the broadcast multicast service and each DAI in uplink, determine the length of the corresponding HARQ-ACK sub-codebook according to a DAI in downlink included in the scheduling signaling sent to the terminal for the broadcast multicast service.

In one embodiment, when determining, according to the identifier G-RNTI of each broadcast multicast service, the corresponding relationship between each G-RNTI and each DAI in uplink, the processor is configured to:

acquire scheduling signaling sent to the terminal for any one or more broadcast multicast services, where the scheduling signaling includes indication information, the indication information is used to indicate a DAI in uplink corresponding to a G-RNTI of one or more broadcast multicast services scheduled currently;

determine the corresponding relationship between each G-RNTI and each DAI in uplink according to the indication information of the scheduling signaling.

In one embodiment, the processor, when determining the corresponding relationship between each G-RNTI and each DAI in uplink according to the scheduling signaling, is configured to:

if for a same HARQ-ACK sub-codebook of any broadcast multicast service, plural pieces of scheduling signaling need to be sent to the terminal, and indication information in each piece of scheduling signaling indicates a different DAI in uplink corresponding to the G-RNTI of the one or more broadcast multicast services scheduled currently, determine a corresponding relationship between the G-RNTI of the one or more broadcast multicast services scheduled currently and the DAI in uplink, based on indication information of a last piece of scheduling signaling.

In one embodiment, the processor, when determining the corresponding relationship between each G-RNTI and each DAI in uplink according to the scheduling signaling, is configured to:

if the scheduling signaling does not indicate the DAI in uplink corresponding to the G-RNTI of the one or more broadcast multicast services scheduled currently, correspond the G-RNTI of the one or more broadcast multicast services scheduled currently to a default DAI in uplink; or the processor is further configured to:

if the scheduling signaling does not indicate the DAI in uplink corresponding to the G-RNTI of the one or more broadcast multicast services scheduled currently, determine the length of the corresponding HARQ-ACK sub-codebook according to a DAI in downlink included in a last piece of scheduling signaling received for the broadcast multicast service.

In one embodiment, when determining, according to the identifier G-RNTI of each broadcast multicast service, the corresponding relationship between each G-RNTI and each DAI in uplink, the processor is configured to:

acquire scheduling signaling sent to the terminal for the broadcast multicast service;

for one or more broadcast multicast services scheduled currently, establish a corresponding relationship between a G-RNTI of the one or more broadcast multicast services scheduled currently and each DAI in uplink sequentially in a predetermined order of the G-RNTI.

In one embodiment, the processor, when establishing the corresponding relationship between the G-RNTI of the one or more broadcast multicast services scheduled currently and each DAI in uplink sequentially in the predetermined order of G-RNTI, is configured to:

establish the corresponding relationship between the G-RNTI of the one or more broadcast multicast services scheduled currently and each DAI in uplink sequentially, in an ascending order or a descending order of the G-RNTI of the one or more broadcast multicast services scheduled currently.

In one embodiment, when determining the length of the corresponding HARQ-ACK sub-codebook, according to the corresponding relationship and the scheduling signaling sent to the terminal for the broadcast multicast service, the processor is configured to:

determine a value of each DAI in uplink according to the corresponding relationship and uplink DAI information included in the scheduling signaling;

determine, according to the value of each DAI in uplink, a length of a HARQ-ACK sub-codebook scheduled currently corresponding to each DAI in uplink.

In one embodiment, the processor, when determining, according to the value of each DAI in uplink, the length of the HARQ-ACK sub-codebook scheduled currently corresponding to each DAI in uplink, is configured to:

for any DAI in uplink, determine whether the terminal feeds back the corresponding HARQ-ACK sub-codebook, according to a value of the DAI in uplink and whether to send scheduling signaling for scheduling each broadcast multicast service corresponding to the DAI in uplink to the terminal;

if it is determined that the terminal does not feedback the corresponding HARQ-ACK sub-codebook, determine that the length of the corresponding HARQ-ACK sub-codebook scheduled currently is 0; or if it is determined that the terminal feeds back the corresponding HARQ-ACK sub-codebook, determine, according to the value of the DAI in uplink, the length of the corresponding HARQ-ACK sub-codebook scheduled currently.

In one embodiment, when determining the length of the corresponding HARQ-ACK sub-codebook, according to the corresponding relationship and the scheduling signaling sent to the terminal for the broadcast multicast service, the processor is configured to:

if the scheduling signaling does not include uplink DAI information corresponding to the HARQ-ACK sub-codebook scheduled currently, determine, according to a DAI in downlink included in the scheduling signaling, the length of the HARQ-ACK sub-codebook scheduled currently.

In one embodiment, the processor is further configured to:

determine a length of a HARQ-ACK codebook according to a length of each HARQ-ACK sub-codebook.

In one embodiment of the present disclosure provides a DAI in uplink indication apparatus, applied to a terminal, including:

a number determining unit, configured to acquire the number of DAIs in uplink configured by a network device for broadcast multicast services;

a corresponding relationship determining unit, configured to determine a corresponding relationship between a HARQ-ACK sub-codebook of each broadcast multicast service and each DAI in uplink;

a codebook length determining unit, configured to determine the number of bits of the corresponding HARQ-ACK sub-codebooks, according to the corresponding relationship and scheduling signaling received from the network device for a broadcast multicast service.

In one embodiment of the present disclosure provides a DAI in uplink indication apparatus, applied to a network device, including:

a number determining unit, configured to acquire the number of DAIs in uplink for broadcast multicast services;

a corresponding relationship determining unit, configured to determine a corresponding relationship between a HARQ-ACK sub-codebook of each broadcast multicast service and each DAI in uplink;

a codebook length determining unit, configured to determine the number of bits of the corresponding HARQ-ACK sub-codebooks, according to the corresponding relationship and scheduling signaling sent to a terminal for a broadcast multicast service; and/or send the scheduling signaling for scheduling the broadcast multicast service to the terminal, to make the terminal determine the length of the corresponding HARQ-ACK sub-codebook according to the corresponding relationship and the scheduling signaling.

In one embodiment of the present disclosure provides a processor-readable storage medium having a computer program stored thereon, where the computer program is used to cause the processor to execute the method according to the embodiments.

In one embodiment of the present disclosure provides a processor-readable storage medium having a computer program stored thereon, where the computer program is used to cause the processor to execute the method according to the embodiments.

In one embodiment of the present disclosure provides a computer program product, including a computer program which is used to cause the processor to execute the method according to the embodiments.

In one embodiment of the present disclosure provides a computer program product, including a computer program which is used to cause the processor to execute the method according to the embodiments.

The present disclosure provides a DAI in uplink indication method, a device and a storage medium. By acquiring the number of DAIs in uplink configured by a network device for broadcast multicast services; determining a corresponding relationship between a HARQ-ACK sub-codebook of each broadcast multicast service and each DAI in uplink; determining a length of a corresponding HARQ-ACK sub-codebook, according to the corresponding relationship and scheduling signaling received from the network device for a broadcast multicast service, in the embodiments of the present disclosure, there is no need to configure DAIs in uplink according to the maximum number of broadcast multicast services or the maximum number of HARQ-ACK sub-codebooks possibly generated. However, the purpose of determining the length of the HARQ-ACK sub-codebook can still be achieved, scheduling flexibility of the network device can be improved, and signaling overheads of the DAIs in uplink can be reduced.

It should be understood that what is described in the summary above is not intended to limit key or important features of embodiments of the present disclosure, nor is it intended to limit the scope of the present disclosure. Other features of the present disclosure will be easily understood through the following description.

BRIEF DESCRIPTION OF DRAWINGS

In order to describe the embodiments in the present disclosure or prior art more clearly, the following will briefly introduce drawings that need to be used in the description of the embodiments or prior art.

FIG. 1*c* is a schematic diagram of an application scenario of a DAI in uplink indication method provided by an embodiment of the present disclosure.

FIG. 2 is a flowchart of a DAI in uplink indication method provided by an embodiment of the present disclosure.

DESCRIPTION OF EMBODIMENTS

Figure 1A:
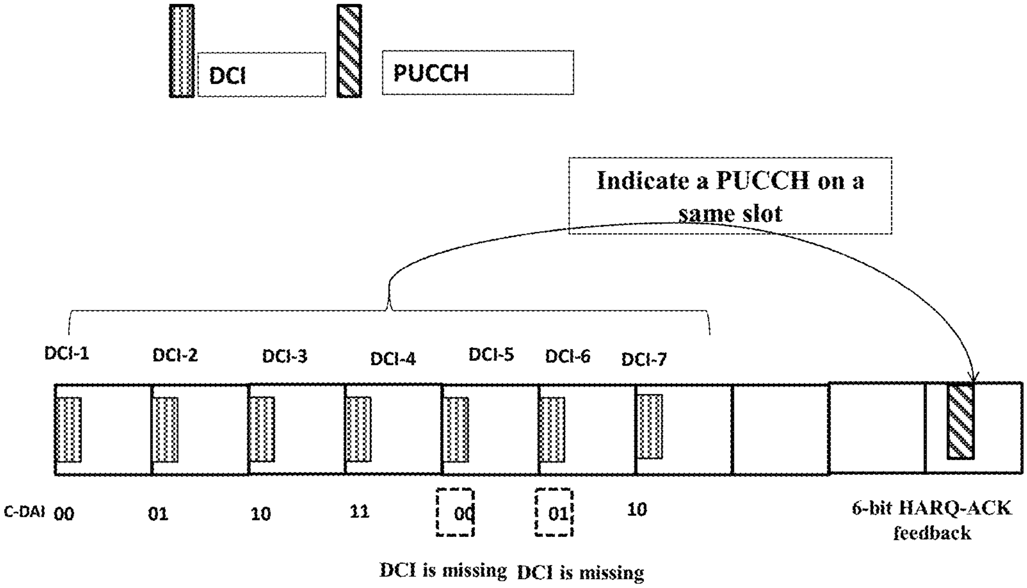
FIG. 1*a* is a schematic diagram of a dynamic codebook in the prior art.

The term "and/or" in the present disclosure is an association relationship describing associated objects, and represents that there may be three relationships. For example, A and/or B may represent three situations: presence of A only, presence of both A and B, and presence of B only. The character "/" herein generally represents an "or" relationship between contextual objects.

The term "plurality" in the present disclosure refers to two or more than two, and other quantifiers are similar thereto.

In embodiments of the present disclosure, it is assumed that G-RNTIs are used to distinguish different scheduling broadcast multicast services. In actual implementation, other identifiers or names may be used instead of the G-RNTIs to distinguish different broadcast multicast services.

In the NR R17 MBS standard, dynamic (type-2) feedback of a broadcast multicast service HARQ-ACK codebook is supported. When a terminal receives multiple broadcast multicast services, a base station configures multiple G-RNTIs for the terminal to identify different broadcast multicast services. For type-2 codebook generation, DAI counting is performed for different broadcast multicast services respectively, and respective HARQ-ACK sub-codebooks are generated, which will cause the terminal to generate multiple HARQ-ACK sub-codebooks of the broadcast multicast at the same time. The dynamic HARQ-ACK codebook (type-2) mechanism in the prior art is specifically as follows:

In an existing 5G system, a mechanism for generating a dynamic HARQ-ACK codebook is supported, its principle is to add DAI indication when a base station sends scheduling signaling DCI (Downlink Control Information), and according to DAI counting, a terminal side computes the number of DCIs and PDSCHs (Physical Downlink Shared Channel) actually sent by the base station, to determine the number of PDSCHs included in a HARQ-ACK codebook that need to be fed back.

In the following, a single-carrier scenario is taken as an example to describe the process. In the single-carrier scenario, there is only C-DAI (count-DAI, count-DAI).

As shown in FIG. Ta, a base station schedules 8 PDSCHs to a terminal. The scheduling information indicates that time slot positions for PUCCH feedback are in the same time slot, and HARQ-ACK information of the 8 PDSCHs is desired to be fed back (if each PDSCH corresponds to HARQ-ACK bit feedback, the HARQ-ACK codebook is 8). Due to uncertainty of a wireless channel, DCI-5 and DCI-6 are missed by the terminal side. The terminal receives C-DAI=3 (corresponding bit information is indicated as 10) in the scheduling signaling DCI-7, and receives C-DAI=4 in the scheduling signaling DCI-4 in a preceding time. The terminal can know that 2 DCIs are missing between DCI-4 and DCI-7 according to the DAI values. In this way, the terminal can still calculate the total number of PDSCHs as 7 according to the HARQ-ACK feedback.

In the prior art, it is assumed that the number of DCIs that the terminal consecutively misses will not exceed 3, so the DAI in the example is indicated by 2-bit information, which is called count-DAI (C-DAI).

In addition, in order to support multi-carrier HARQ feedback, T-DAI (total DAI, total DAI) is introduced on the basis of the C-DAI, which is indicated by using 2-bit information. The C-DAI and the T-DAI are used jointly to determine the number of PDSCHs fed back actually, to determine a length of the HARQ-ACK codebook, for example, as shown in FIG. 1*b*.

For ease of description, a value of the C-DAI/T-DAI is represented as acyclic decimal, where the C-DAI represents a sequence number of the PDSCH scheduled this time. For example, C-DAI=1 represents a first DCI being scheduled. The T-DAI indicates the number of all scheduled PDSCHs at a corresponding DCI scheduling time. For example, when T-DAI=2, it represents that a total of 2 PDSCHs are scheduled; and for another example, when T-DAI=9, it represents that a total of 9 PDSCHs are scheduled.

For a DAI in uplink, during a dynamic HARQ-ACK codebook generation process, a T-DAI value of last DCI scheduled for a codebook is indicated, which is used to calculate the length of the codebook carried on a PUSCH. If no scheduling DCI for a downlink PDSCH is received and the DAI indicates $$V_{T-DAI}^{UL} = 4,$$

the terminal does not feedback the dynamic HARQ-ACK codebook (which also means that the base station does not send downlink data scheduling signaling); otherwise, the DAI in uplink is used as the T-DAI to calculate the length of the HARQ-ACK codebook fed back.

During a static HARQ-ACK codebook generation process, 1-bit information is indicated, which is used to calculate the length of a codebook carried on a PUSCH. If no scheduling DCI for a downlink PDSCH is received, and $$V_{T-DAI}^{UL} = 0,$$

the terminal does not feedback the static HARQ-ACK codebook; otherwise, the static codebook is generated according to an existing protocol rule.

Based on the above background, when multiple HARQ-ACK sub-codebooks are multiplexed on a PUSCH, scheduling signaling of the PUSCH may carry a DAI in uplink (UL DAI) which is used to indicate count information of one or more HARQ-ACK sub-codebooks. When the terminal generates multiple HARQ-ACK sub-codebooks due to broadcast multicast services, each broadcast multicast service needs to be configured with a DAI in uplink, which increases overheads of scheduling signaling. For example, as shown in Table 1, when there are N broadcast multicast services, N DAIs in uplink need to be configured, and N*2 information bits need to be newly added, which increases overheads of the scheduling signaling.

TABLE 1

Field information of UL DAI in scheduling signaling

| Field name | Message length | Description | Notes |
|---|---|---|---|
| First DAI | 1 or 2 bits | 1 bit: when the HARQ feedback is a semi-static HARQ-ACK codebook (semi-static HARQ-ACK codebook) 2 bit: when the HARQ feedback is a dynamic HARQ-ACK codebook (dynamic HARQ-ACK codebook) | Prior art 2 bits correspond to a first codebook or sub-codebook |
| Second DAI | 0 or 2 bits | 2 bits: when the HARQ feedback is that the number of dynamic HARQ-ACK sub-codebooks is 2. Otherwise 0 bit | Prior art: 2 bits correspond to a second codebook or sub-codebook |
| First broadcast multicast DAI, second broadcast multicast DAI . . . Nth broadcast multicast DAI | 2*N bits | N is the number of broadcast multicast services configured by the base station. | N*2 information bits need to be newly added |

In order to solve the above problems, in the embodiment of the present disclosure, the DAI in uplink is not configured according to the maximum number of broadcast multicast services, or is not configured according to the maximum number of possibly generated HARQ-ACK sub-codebooks. That is, the flexibility of base station scheduling is ensured, and signaling overheads of DAIs in uplink are reduced, the number of DAIs in uplink is configured as one, a corresponding relationship between the HARQ-ACK sub-codebook of each broadcast multicast service and each DAI in uplink is configured, and the length of the corresponding HARQ-ACK codebook can be determined according to the DAI in uplink when the broadcast multicast service is scheduled.

Figure 1B:
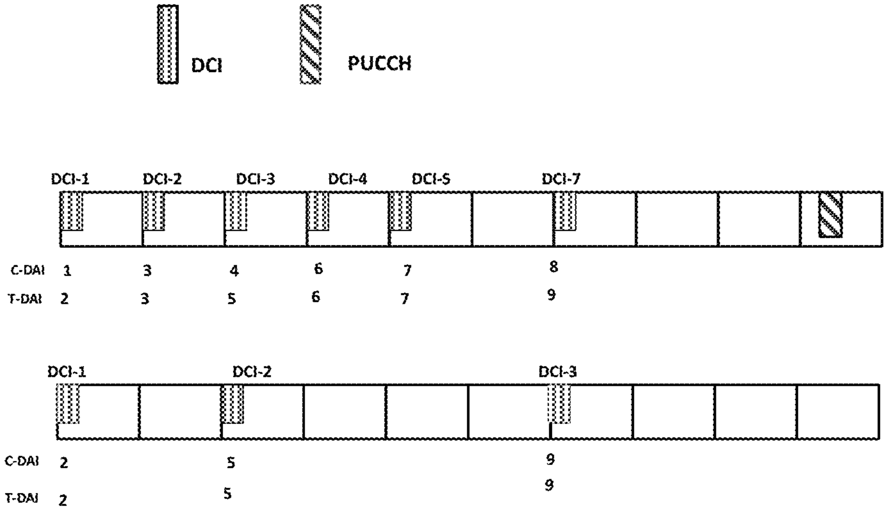
FIG. 1*b* is another schematic diagram of a dynamic codebook in the prior art.

The embodiment of the present disclosure is applied to an application scenario as shown in FIG. 1*c*. The application scenario includes a terminal device 101 and a network device 102. The terminal device 101 acquires the number of DAIs in uplink configured by the network device 102 for broadcast multicast services, and determines a corresponding relationship between a HARQ-ACK sub-codebook of each broadcast multicast service and each DAI in uplink. When receiving scheduling signaling, sent by the network device 102, for scheduling a broadcast multicast service, the terminal device 101 determines the number of bits of the corresponding HARQ-ACK sub-codebooks according to the corresponding relationship and the scheduling signaling received from the network device for the broadcast multicast service. In one embodiment, the number of DAIs in uplink and/or the corresponding relationship between the HARQ-ACK sub-codebook of each broadcast multicast service and each DAI in uplink can also be determined through other methods, and is not limited to the method shown in FIG. 1.

Of course, it should be noted that the network device 102 can also use the same method to determine the length of the HARQ-ACK codebook corresponding to the scheduled broadcast multicast service, and the length of the HARQ-ACK codebook determined by the terminal 101 should be the same as the length of the HARQ-ACK codebook determined by the network device 102.

The terminal involved in the embodiments of the present disclosure may be a device that provides voice and/or data connectivity to a user, a handheld device with a wireless connection function, or other processing devices connected to a wireless modem. The name of the terminal device may also vary in different systems. For example, in a 5G system, the terminal may be called a user equipment (User Equipment, UE). A wireless terminal device may communicate with a core network (Core Network, CN) via a radio access network (Radio Access Network, RAN). The wireless terminal device may be a mobile terminal device, such as a cell phone (or "cellular" phone) and a computer with a mobile terminal device, for example, a portable, pocket-sized, handheld, computer built-in, or vehicle-mounted mobile device, that exchanges language and/or data with the radio access network. For example, a personal communication system (Personal Communication System, PCS) phone, a cordless phone, a session initiated protocol (Session Initiated Protocol, SIP) phone, a wireless local loop (Wireless Local Loop, WLL) station, a personal digital assistant (Personal Digital Assistant, PDA) or other devices. The wireless terminal device can also be called a system, a subscriber unit (subscriber unit), a subscriber station (subscriber station), a mobile station (mobile station), a mobile (mobile), a remote station (remote station), an access point (access point), a remote terminal (remote terminal), an access terminal (access terminal), a user terminal (user terminal), a user agent (user agent), and a user device (user device), which are not limited in the embodiments of the present disclosure.

The network device involved in the embodiments of the present disclosure may be a base station, which may include cells providing services to the terminal. Depending on the specific application, the base station can also be called an access point, or a device in the access network that communicates with the wireless terminal device through one or more sectors on an air interface, or other names. The network device may be used to interchange a received air frame with an Internet protocol (Internet Protocol, IP) packet, and may act as a router between the wireless terminal device and the rest of the access network, where the rest of the access network may include the Internet protocol (IP) communication network. The network device may also coordinate the management of attributes of the air interface. For example, the network device involved in the embodiments of the present disclosure may be a network device (Base Transceiver Station, BTS) in a global system for mobile communications (GSM) or code division multiple access (CDMA), or a network device (NodeB, NB) in a Wide-band Code Division Multiple Access (WCDMA), or an evolutional network device (evolutional Node B, eNB or eNodeB) in a long term evolution (LTE) system, or a 5G base station (gNB) in a 5G network architecture (next generation system), or a home evolved base station (HeNB), or a relay node, a home base station (femto), a pico base station (pico), etc., which are not limited in the embodiments of the present disclosure. In some network structures, the network device may include a centralized unit (CU) node and a distributed unit (DU) node, and the centralized unit and the distributed unit may also be geographically separated.

The embodiments of the present disclosure will be described as follows clearly and completely in conjunction with accompanying drawings in the embodiments of the present disclosure. Apparently, the described embodiments are merely a part rather than all of the embodiments of the present disclosure.

The method and the apparatus are based on the same application concept. Since the method and the apparatus solve the problem with similar principles, reference can be made to each other for the implementation of the apparatus and the method, and the repetition is not described again.

Embodiment 1

FIG. 2 is a flowchart of a DAI in uplink indication method provided by this embodiment. As shown in FIG. 2, this embodiment provides a DAI in uplink indication method. The execution subject is a terminal. Specific steps of the DAI in uplink indication method are as follows.

S201, acquire the number of DAIs in uplink configured by a network device for broadcast multicast services.

In the embodiment, the network device is required to configure the number of DAIs in uplink used by the terminal for broadcast multicast services, to make the terminal only use the DAI in uplink(s) having the number of DAIs in uplink to indicate count information of HARQ-ACK sub-codebooks for multiple broadcast multicast services, where the number of DAIs in uplink may be less than the number of broadcast multicast services. To be noted: the network device can pre-configure the number of DAIs in uplink and send it to the terminal; or the terminal can also acquire the number of DAIs in uplink from the network device when needed; or the terminal can also acquire the number of DAIs in uplink from the network device in advance and store it locally and acquire the number of DAIs in uplink locally when needed.

In one embodiment, in the embodiment, the network device can configure the number of broadcast multicast services and a preset threshold value, and then the network device and/or the terminal determines the number of DAIs in uplink according to a specific method based on the number of broadcast multicast services and the preset threshold value.

In one embodiment, in the embodiment, a fixed preset value configured by the network device may also be used as the number of DAIs in uplink.

Of course, the present disclosure is not limited to the above-mentioned examples, and details will not be repeated here.

S202, determine a corresponding relationship between a HARQ-ACK sub-codebook of each broadcast multicast service and each DAI in uplink.

In the embodiment, since the network device configures the number of DAIs in uplink used for broadcast multicast services, and the number of broadcast multicast services may not be equal to the number of DAIs in uplink, especially when the number of DAIs in uplink is less than the number of broadcast multicast services, it is necessary to determine which DAI in uplink a HARQ-ACK sub-codebook of each broadcast multicast service corresponds to.

The corresponding relationship between the HARQ-ACK sub-codebook of each broadcast multicast service and each DAI in uplink can be fixed, pre-configured by the network device, or determined in advance by the network device and/or the terminal according to a specific policy; or the corresponding relationship between the HARQ-ACK sub-codebook of each broadcast multicast service and each DAI in uplink may not be fixed, and is configured temporarily through scheduling signaling when the network device schedules the broadcast multicast service.

In one embodiment, since each broadcast multicast service has an identifier G-RNTI configured by the network device, a corresponding relationship between each G-RNTI and each DAI in uplink can be determined according to the identifier G-RNTI of each broadcast multicast service, and then the corresponding relationship between the HARQ- ACK sub-codebook of the broadcast multicast service corresponding to each G-RNTI and each DAI in uplink can be determined according to the corresponding relationship between each G-RNTI and each DAI in uplink.

For determining the corresponding relationship between each G-RNTI and each DAI in uplink according to the identifier G-RNTI of each broadcast multicast service, a specific algorithm can be used to perform grouping on the G-RNTI of each broadcast multicast service and specify which DAI in uplink each group corresponds to; or the network device can also prespecify the corresponding relationship between each G-RNTI and each DAI in uplink; or when the network device needs to schedule any broadcast multicast service, the network device can indicate the corresponding relationship between the G-RNTI(s) of one or more broadcast multicast services scheduled currently and the DAI in uplink(s), in the scheduling signaling. Of course, in the embodiment, it is also possible to determine the corresponding relationship between the HARQ-ACK sub-codebook of each broadcast multicast service and each DAI in uplink through other manners, which will not be repeated here.

S203, determine the number of bits of the corresponding HARQ-ACK sub-codebooks, according to the corresponding relationship and scheduling signaling received from the network device for a broadcast multicast service.

In the embodiment, when the network device needs to schedule a certain broadcast multicast service or certain broadcast multicast services, the network device sends scheduling signaling for the broadcast multicast service(s) to the terminal. The scheduling signaling may include uplink DAI information. The uplink DAI information of the one or more broadcast multicast services scheduled currently is determined according to the scheduling signaling and the corresponding relationship between the HARQ-ACK sub-codebook of each broadcast multicast service and each DAI in uplink. And then a length of the HARQ-ACK sub-codebook(s) of the one or more broadcast multicast services scheduled currently can be determined based on the uplink DAI information of the one or more broadcast multicast services scheduled currently.

It should be noted that the scheduling signaling may not include the uplink DAI information corresponding to the HARQ-ACK sub-codebook(s) scheduled currently, the length of the HARQ-ACK sub-codebook(s) scheduled currently is determined according to a DAI in downlink included in the scheduling signaling.

Based on the above-described embodiment, In one embodiment, the terminal can also determine a length of a HARQ-ACK codebook according to the length of each HARQ-ACK sub-codebook. In the embodiment, the HARQ-ACK of the broadcast multicast service can be divided into at least one HARQ-ACK sub-codebook. Therefore, the HARQ-ACK codebook is the sum of the length(s) of the HARQ-ACK sub-codebook(s) into which the HARQ-ACK is divided. The length of the HARQ-ACK codebook can be obtained by summing the length(s) of the HARQ-ACK sub-codebook(s).

The embodiment provides a DAI in uplink indication method. The number of DAIs in uplink configured by a network device for broadcast multicast services is determined; a corresponding relationship between a HARQ-ACK sub-codebook of each broadcast multicast service and each DAI in uplink is determined; the number of bits of the corresponding HARQ-ACK sub-codebooks is determined according to the corresponding relationship and scheduling signaling received from the network device for a broadcast multicast service. In the embodiment, there is no need to configure DAIs in uplink according to the maximum number of broadcast multicast services or the maximum number of possibly generated HARQ-ACK sub-codebooks, but the purpose of determining the length of a HARQ-ACK sub-codebook can still be achieved, thus scheduling flexibility of the network device can be improved, and signaling overheads of the DAIs in uplink can be reduced.

Embodiment 2

In the embodiment, the implementation of S201 in Embodiment 1, for acquiring the number of DAIs in uplink configured by the network device for the broadcast multicast services, is introduced in detail.

Figure 3:
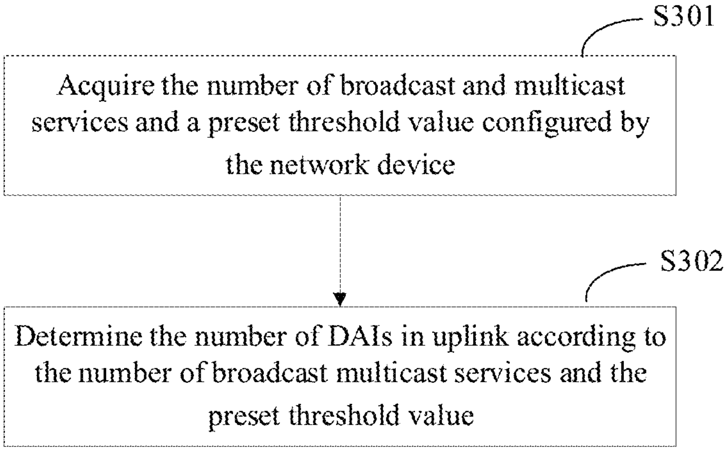
FIG. 3 is a flowchart of a DAI in uplink indication method provided by another embodiment of the present disclosure.

In an implementation, as shown in FIG. 3, S201 for acquiring the number of DAIs in uplink configured by the network device for the broadcast multicast services may include:

S301, acquire the number of broadcast multicast services and a preset threshold value configured by the network device;

S302, determine the number of DAIs in uplink according to the number of broadcast multicast services and the preset threshold value.

In the embodiment, the network device can pre-configure the number of broadcast multicast services n and a preset threshold value K (where K can be determined by a protocol, for example, K=2), where the network device can configure, through higher-layer signaling, an identifier G-RNTI of a broadcast multicast service that needs HARQ-ACK feedback. If n different G-RNTIs are configured, they are: G-RNTI-1, G-RNTI-2 . . . G-RNTI-n, respectively.

Further, the network device may send the number of broadcast multicast services n and the preset threshold value K to the terminal, or the terminal may request from the network device for the number of broadcast multicast services n and the preset threshold value K, and then the terminal may determine the number of DAIs in uplink m according to the number of broadcast multicast services n and the preset threshold value K; or the network device may determine the number of DAIs in uplink m according to the number of broadcast multicast services n and the preset threshold value K, and then send the number of DAIs in uplink m to the terminal.

In one embodiment, S302 for determining the number of DAIs in uplink according to the number of broadcast multicast services and the preset threshold value includes:

if the number of broadcast multicast services is less than or equal to the preset threshold value, determining that the number of DAIs in uplink is equal to the number of broadcast multicast services, that is, when $n \le K$, $m=n$; or if the number of broadcast multicast services is greater than the preset threshold value, determining that the number of DAIs in uplink is equal to the preset threshold value, that is, when $n>K$, $m=K$.

In the embodiment, the number of DAIs in uplink m is selected from a minimum value between the number of broadcast multicast services n and the preset threshold value K, which can effectively reduce signaling overheads of DAIs in uplink.

In one embodiment, the determining the number of DAIs in uplink according to the number of broadcast multicast services and the preset threshold value in includes:

acquiring a ratio of the number of broadcast multicast services to the preset threshold value, rounding the ratio, and determining a rounded result as the number of DAIs in uplink.

In the embodiment, a ratio of the number of broadcast multicast services n to the preset threshold value K can be calculated first, and the ratio can be rounded, where the rounding can be rounding up, to obtain the number of DAIs in uplink m. The specific formula is as follows:

m=[n/K], [.] represents rounding up where the rounding up is that when the ratio has a decimal, add 1 to an integer part and discard a decimal part. Of course, rounding down can also be used, which is not limited here.

In an implementation, S201 for acquiring the number of DAIs in uplink preset by the network device for the broadcast multicast services includes:

acquiring a preset value configured by the network device, and determining the preset value as the number of DAIs in uplink.

In the embodiment, the network device directly configures a fixed preset value, and determines the preset value as the number of DAIs in uplink m, for example, m=1, m=2 or m=3. The network device may send the preset value to the terminal (for example, through a broadcast or multicast message, or through a UE-specific message), or the terminal may request from the network device for the preset value.

In other embodiments, the method for acquiring the number of DAIs in uplink is not limited to the above examples, which will not be repeated here.

Embodiment 3

In the embodiment, the implementation of S202 in Embodiment 1, for determining the corresponding relationship between the HARQ-ACK sub-codebook of each broadcast multicast service and each DAI in uplink is introduced in detail.

Figure 4:
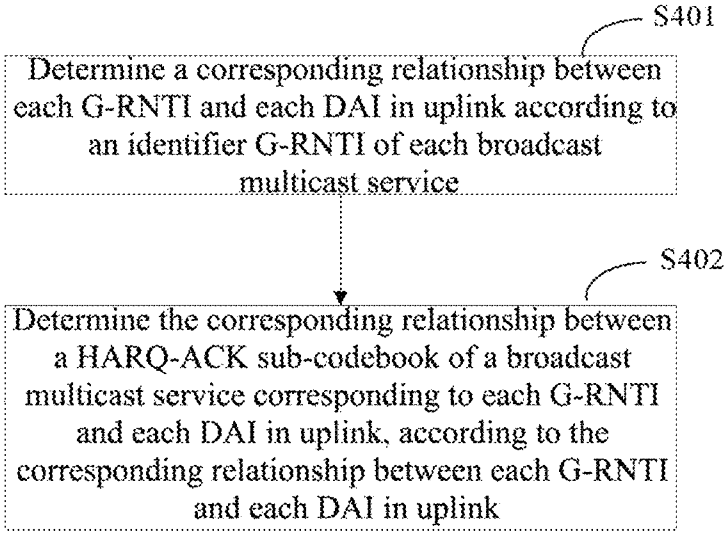
FIG. 4 is a flowchart of a DAI in uplink indication method provided by another embodiment of the present disclosure.

As shown in FIG. 4, the determining the corresponding relationship between the HARQ-ACK sub-codebook of each broadcast multicast service and each DAI in uplink in S203 may include:

S401, determine, according to an identifier G-RNTI of each broadcast multicast service, a corresponding relationship between each G-RNTI and each DAI in uplink;

S402, determine a corresponding relationship between a HARQ-ACK sub-codebook of a broadcast multicast service corresponding to each G-RNTI and each DAI in uplink, according to the corresponding relationship between each G-RNTI and each DAI in uplink.

In the embodiment, since each broadcast multicast service has an identifier G-RNTI configured by the network device, and a respective HARQ-ACK sub-codebook will be generated for each broadcast multicast service when each broadcast multicast service is scheduled. Therefore, in the embodiment, the corresponding relationship between each G-RNTI and each DAI in uplink is determined, that is, the corresponding relationship between the HARQ-ACK sub-codebook of each broadcast multicast service and each DAI in uplink is determined.

In an embodiment, based on the above embodiment, the determining, according to the identifier G-RNTI of each broadcast multicast service, the corresponding relationship between each G-RNTI and each DAI in uplink in S401 includes:

performing a modulo operation on each G-RNTI to the number of DAIs in uplink, determining G-RNTIs with a same modulo result as a G-RNTI group, and establishing a corresponding relationship between the G-RNTI group and a DAI in uplink having a sequence number equal to the modulo result.

In the embodiment, a modulo operation can be performed on the value of G-RNTI to the number of DAIs in uplink m, where the modulo is also called remainder, and details are as follows:

$$UL\ DAI(i) = \mathrm{mod}(G-RNTI, m)$$

the G-RNTIs with a same modulo result are determined as a G-RNTI group, each G-RNTI group corresponds to a DAI in uplink, the DAI has a sequence number equal to the modulo result. For example, it is assumed that m=3, a corresponding relationship between modulo results of G-RNTI-1 to G-RNTI-7 and DAIs in uplink is shown in Table 2:

TABLE 2

Corresponding relationship between G-RNTI and UL DAI (calculated based on a modulo formula)

| G-RNTI | G-RNTI-1 | G-RNTI-2 | G-RNTI-3 | G-RNTI-4 | G-RNTI-5 | G-RNTI-6 | G-RNTI-7 |
|---|---|---|---|---|---|---|---|
| Value | 3 | 4 | 5 | 6 | 7 | 8 | 9 |
| Modulo result | 0 | 1 | 2 | 0 | 1 | 2 | 0 |
| Corresponding UL DAI | First | Second | Third | First | Second | Third | First |

This method is advantageous in that the terminal and the network device can use the same protocol rule to determine the corresponding relationship between the G-RNTIs and the UL DAIs. Although this method has a low flexibility, its advantage is that the method reduces the configuration process.

In another embodiment, based on the above embodiment, the determining, according to the identifier G-RNTI of each broadcast multicast service, the corresponding relationship between each G-RNTI and each DAI in uplink in S401 may further include: determining the corresponding relationship between each G-RNTI and each DAI in uplink according to high-layer signaling sent by the network device received in advance, where the high-layer signaling includes the corresponding relationship between each G-RNTI and each DAI in uplink preset by the network device when pre-configuring the broadcast multicast service.

In the embodiment, the network device can configure the corresponding relationship between each G-RNTI and each DAI in uplink through high-layer signaling. The high-layer signaling can be RRC (Radio Resource Control). When the network device configures a broadcast multicast service, a corresponding G-RNTI can be associated with a DAI in uplink, to indicate which DAI in uplink will be used to calculate a sub-codebook length when generating a HARQ-ACK sub-codebook for the broadcast multicast service corresponding to the G-RNTI. For example, RRC-configured association information is shown in Table 3:

TABLE 3

Corresponding relationship between G-RNTI and UL DAI (based on RRC configuration)

| G-RNTI | G-RNTI-1 | G-RNTI-2 | G-RNTI-3 | G-RNTI-4 | G-RNTI-5 | G-RNTI-6 | G-RNTI-7 |
|---|---|---|---|---|---|---|---|
| Configured associative UL DAI | First | First | First | Second | Second | Third | Null |

In the above table, G-RNT-1/2/3 are configured to associate with a first UL DAI, and G-RNTI-4/5 are configured to associate with a second UL DAI. G-RNTI-7 is not associated with any UL DAI.

It should be noted that, if for any broadcast multicast service, the high-layer signaling does not include a corresponding relationship between the G-RNTI of the broadcast multicast service and each DAI in uplink (for example, G-RNTI-7 in Table 3), then when the length of the HARQ-ACK sub-codebook of the broadcast multicast service is determined in S203, the length of the corresponding HARQ-ACK sub-codebook is determined according to a DAI in downlink included in the received scheduling signaling for the broadcast multicast service. That is, since the DAI in downlink of the broadcast multicast service in the scheduling signaling is usually equal to the DAI in uplink, if the DAI in uplink corresponding to the broadcast multicast service is not indicated in the high-layer signaling, a DAI in downlink (DL DAI) in a received last scheduling signaling DCI can be used to determine the length of the HARQ-ACK sub-codebook of the broadcast multicast service.

In another embodiment, based on the above embodiment, the determining, according to the identifier G-RNTI of each broadcast multicast service, the corresponding relationship between each G-RNTI and each DAI in uplink in S401 may further include:

receiving scheduling signaling sent by the network device for any one or more broadcast multicast services, where the scheduling signaling includes indication information, the indication information is used to indicate a DAI in uplink corresponding to a G-RNTI of one or more broadcast multicast services scheduled currently; determining the corresponding relationship between each G-RNTI and each DAI in uplink according to the indication information of the scheduling signaling.

In the embodiment, the network device adds indication information to the scheduling signaling DCI for scheduling the broadcast multicast service, indicating the DAI in uplink (s) corresponding to the G-RNTI(s) of one or more broadcast multicast services scheduled currently. In one embodiment, a bit width of the indication information in the DCI can be determined based on the number of DAIs in uplink m, and details are as follows:

$$\text{Indication\_bits} = \lceil \log_2(m) \rceil$$

for example, if m=2, it means that there are 2 DAIs in uplink available for broadcast multicast services, therefore, Indication_bits=1, it is necessary to add indication information of a 1-bit length in scheduling signaling DCI for scheduling a broadcast multicast service, to indicate an association relationship between a HARQ-ACK sub-codebook generated for the broadcast multicast service scheduled currently and the two available DAIs in uplink. For example, 0 represents a first DAI in uplink for the broadcast multicast, and 1 represents a second DAI in uplink for the broadcast multicast.

If m=4, it means that there are 4 DAIs in uplink available for broadcast multicast services, therefore Indication_bits=2, it is necessary to add indication information of a 2-bit length in scheduling signaling DCI for scheduling a broadcast multicast service, to indicate an association relationship between a HARQ-ACK sub-codebook generated for the broadcast multicast service scheduled currently and the 4 available DAIs in uplink. For example, 00 represents a first DAI in uplink for the broadcast multicast, 01 represents a second DAI in uplink for the broadcast multicast, 10 represents a third DAI in uplink for the broadcast multicast, and 11 represents a fourth DAI in uplink for the broadcast multicast.

It should be noted that, if for a same HARQ-ACK sub-codebook of any broadcast multicast service, plural pieces of scheduling signaling sent by the network device are received, and indication information in each piece of scheduling signaling indicates a different DAI in uplink corresponding to the G-RNTI of the one or more broadcast multicast services currently scheduled, determine a corresponding relationship between the G-RNTI of the one or more broadcast multicast services scheduled currently and the DAI in uplink, based on indication information of a last piece of scheduling signaling.

In addition, if the scheduling signaling does not indicate the DAI in uplink corresponding to the G-RNTI of the one or more broadcast multicast services scheduled currently, the G-RNTI of the one or more broadcast multicast services scheduled currently is corresponded to a default DAI in uplink, that is, corresponding to which DAI in uplink by default can be preset, if the scheduling signaling does not indicate the DAI in uplink corresponding to the G-RNTI; or, when determining the length of the HARQ-ACK sub-codebook in S203, the length of the corresponding HARQ-ACK sub-codebook is determined according to a DAI in downlink included in a last scheduling signaling received for the broadcast multicast service.

In another embodiment, based on the above embodiment, the determining, according to the identifier G-RNTI of each broadcast multicast service, the corresponding relationship between each G-RNTI and each DAI in uplink in S401 includes: receiving scheduling signaling sent by the network device for a broadcast multicast service; for one or more broadcast multicast services scheduled currently, establishing a corresponding relationship between a G-RNTI of the one or more broadcast multicast services scheduled currently and each DAI in uplink sequentially in a predetermined order of the G-RNTI.

In the embodiment, when the network device schedules a broadcast multicast service, the corresponding relationship between the G-RNTI(s) of one or more broadcast multicast services scheduled currently and each DAI in uplink can be determined in sequence according to a predetermined rule. For example, the G-RNTI(s) of one or more broadcast multicast services scheduled currently is (are) performed with sorting, and the corresponding relationship between the G-RNTI(s) of the one or more broadcast multicast services scheduled currently and each DAI in uplink is determined according to the sorting. In this way, there is no need for pre-configuration from the network device, where the sorting can be sorting in an ascending order or a descending order, of course, there can also be other sorting modes.

For example, when the terminal receives scheduling signaling for two broadcast multicast services (G-RNTI-1=1 and G-RNTI-3=3) from the network device, two HARQ-ACK sub-codebooks need to be generated. The terminal allows for correspondence with DAIs in uplink in an ascending order of the G-RNTIs. That is, a first DAI in uplink corresponds to G-RNTI-1, and a second DAI in uplink corresponds to G-RNTI-3.

For another example: when the terminal receives scheduling signaling for 2 broadcast multicast services (G-RNTI-3=3 and G-RNTI-5=5) from the network device, two HARQ-ACK sub-codebooks need to be generated. The terminal allows for correspondence with DAIs in uplink in an ascending order of the G-RNTIs. That is, a first DAI in uplink corresponds to G-RNTI-3, and a second DAI in uplink corresponds to G-RNTI-5.

Embodiment 4

In the embodiment, the implementation of S203 in Embodiment 1, for determining the length of the corresponding HARQ-ACK sub-codebook, according to the corresponding relationship and the scheduling signaling received from the network device for the broadcast multicast service, is introduced in detail.

Figure 5:
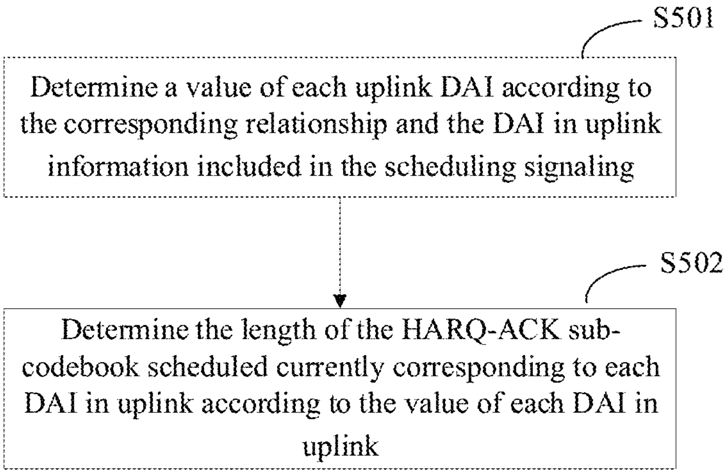
FIG. 5 is a flowchart of a DAI in uplink indication method provided by another embodiment of the present disclosure.

In one embodiment, as shown in FIG. 5, the determining the length of the corresponding HARQ-ACK sub-codebook, according to the corresponding relationship and the scheduling signaling received from the network device for the broadcast multicast service in S203 may include:

S501, determine a value of each DAI in uplink according to the corresponding relationship and uplink DAI information included in the scheduling signaling;

S502, determine, according to the value of each DAI in uplink, a length of a HARQ-ACK sub-codebook scheduled currently corresponding to each DAI in uplink.

In the embodiment, when the network device needs to schedule one or more broadcast multicast services, it sends scheduling signaling for the broadcast multicast service(s) to the terminal. The scheduling signaling can be DCI for scheduling a PUSCH (Physical Uplink Shared Channel, physical uplink shared channel), the scheduling signaling includes m DAIs in uplink configured to calculate the HARQ-ACK sub-codebook(s) of the broadcast multicast service(s). For example, if m is 2, the uplink DAI information included in the scheduling signaling is used to indicate a T-DAI of the HARQ-ACK sub-codebooks of 2 broadcast multicast services. Furthermore, the terminal can acquire a value of each DAI in uplink from the scheduling signaling, and the length of the HARQ-ACK sub-codebook scheduled currently corresponding to each DAI in uplink can be determined according to the value of each DAI in uplink. The specific determining process can adopt an existing determining method, which will not be repeated here.

Based on the above embodiment, In one embodiment, the determining, according to the value of each DAI in uplink, the length of the HARQ-ACK sub-codebook scheduled currently corresponding to each DAI in uplink in S502 specifically includes:

for any DAI in uplink, determining whether to feedback the corresponding HARQ-ACK sub-codebook, according to a value of the DAI in uplink and whether scheduling signaling for scheduling each broadcast multicast service corresponding to the DAI in uplink is received;

if it is determined not to feedback the corresponding HARQ-ACK sub-codebook, determining that the length of the corresponding HARQ-ACK sub-codebook scheduled currently is 0; or if it is determined to feedback the corresponding HARQ-ACK sub-codebook, determining, according to the value of the DAI in uplink, the length of the corresponding HARQ-ACK sub-codebook scheduled currently.

In the embodiment, whether to feedback the HARQ-ACK sub-codebook can be determined first. For example, if a value of an uplink T-DAI indicated by the uplink DAI information is $$V_{T-DAI}^{UL} = 4,$$

and no scheduling signaling of the broadcast multicast service associated with the DAI in uplink is received, the terminal then does not feedback the HARQ-ACK sub-codebook and determines that the length of the HARQ-ACK sub-codebook is 0; otherwise, the terminal needs to feedback the HARQ-ACK sub-codebook, and the uplink DAI information is determined as the T-DAI of the HARQ-ACK codebook corresponding to the G-RNTI, for calculating the length of the HARQ-ACK sub-codebook fed back.

Based on the above embodiment, In one embodiment, when determining the length of the corresponding HARQ-ACK sub-codebook, according to the corresponding relationship and the scheduling signaling received from the network device for the broadcast multicast service, if the scheduling signaling does not include uplink DAI information corresponding to the HARQ-ACK sub-codebook scheduled currently, the length of the HARQ-ACK sub-codebook scheduled currently is determined according to a DAI in downlink included in the scheduling signaling.

Based on the above embodiment, In one embodiment, the terminal can also determine a length of a HARQ-ACK codebook according to a length of each HARQ-ACK sub-codebook. In the embodiment, the HARQ-ACK codebook of the broadcast multicast service(s) can be divided into at least one HARQ-ACK sub-codebook. Therefore, the HARQ-ACK codebook is a sum of the length(s) of the HARQ-ACK sub-codebook(s) into which the HARQ-ACK codebook is divided. The length of the HARQ-ACK code-book can be obtained by summing the length(s) of the HARQ-ACK sub-codebook(s).

In order to describe the DAI in uplink indication method provided by the above embodiments more clearly, an illustrative description is provided below.

Example 1

Step 1: acquire the number of DAIs in uplink m configured by a base station for a broadcast multicast service.

The base station configures, through high-layer signaling, an identifier G-RNTI of a broadcast multicast service that needs HARQ-ACK feedback. If n different G-RNTIs are configured, they are: G-RNTI-1, G-RNTI-2 . . . G-RNTI-n, respectively. In addition, a preset threshold value K can also be determined through a protocol. The number of DAIs in uplink m is determined according to the following formula:

$$m = n, \text{ when } n \le K;$$

$$m = k, \text{ when } n > K;$$

for example, assuming K=3, when n=2, the number of DAIs in uplink m=n=2; when n=10, m=K=3.

Furthermore, after the number of DAIs in uplink is determined, field information of the DAI in uplink for broadcast multicast in the scheduling signaling can be as shown in Table 4.

TABLE 4

| Field information of DAI in uplink for broadcast multicast in scheduling signaling | | | |
|---|---|---|---|
| Field name | Message length | Description | Notes |
| First broadcast multicast DAI | 2 bits | When HARQ feedback is a dynamic HARQ-ACK codebook (dynamic HARQ-ACK codebook) | Used for DAI indication for a broadcast multicast service |
| Second broadcast multicast DAI | 2 bits | When HARQ feedback is a dynamic HARQ-ACK codebook (dynamic HARQ-ACK codebook) | Used for DAI indication for a broadcast multicast service |

TABLE 4-continued

| Field information of DAI in uplink for broadcast multicast in scheduling signaling | | | |
|---|---|---|---|
| Field name | Message length | Description | Notes |
| Third broadcast multicast DAI | 2 bits | When HARQ feedback is a dynamic HARQ-ACK codebook (dynamic HARQ-ACK codebook) | Used for DAI indication for a broadcast multicast service |

Note:
the message length here is assumed to be 2 bits, and it can also be 1 bit or 3 bits or others, which is not limited here.

Step 2: determine a corresponding relationship between a HARQ-ACK sub-codebook of each broadcast multicast service and each DAI in uplink.

A corresponding relationship between each G-RNTI and each DAI in uplink can be determined first, and then the corresponding relationship between the HARQ-ACK sub-codebook of the broadcast multicast service corresponding to each G-RNTI and each DAI in uplink can be determined, where the determining the corresponding relationship between each G-RNTI and each DAI in uplink can adopt any of the following manners.

Manner 1: perform a modulo operation on each G-RNTI to m, as follows:

$$UL\ DAI(i) = \text{mod}(G-RNTI, m)$$

G-RNTIs with a same modulo result are determined as a G-RNTI group, and each G-RNTI group corresponds to a DAI in uplink having a sequence number equal to the modulo result. For example, it is assumed that m=3, a corresponding relationship between modulo results of G-RNTI-1 to G-RNTI-7 and DAIs in uplink are shown in Table 5:

TABLE 5

| Corresponding relationship between G-RNTI and UL DAI (calculated based on a modulo formula) | | | | | | | |
|---|---|---|---|---|---|---|---|
| G-RNTI | G-RNTI-1 | G-RNTI-2 | G-RNTI-3 | G-RNTI-4 | G-RNTI-5 | G-RNTI-6 | G-RNTI-7 |
| Value | 3 | 4 | 5 | 6 | 7 | 8 | 9 |
| Modulo result | 0 | 1 | 2 | 0 | 1 | 2 | 0 |
| Corresponding UL DAI | First | Second | Third | First | Second | Third | First |

Manner 1 is advantageous in that, since the terminal and the base station use the same protocol rule to determine the corresponding relationship between the G-RNTIs and the DAIs in uplink, the configuration process (such as Manner 2) is reduced. While Manner 1 has a disadvantage of low flexibility.

Manner 2: configure a corresponding relationship between each G-RNTI and each DAI in uplink based on high-layer signaling (such as RRC configuration). That is, when configuring a broadcast multicast service, the base station gives an indication to associate a G-RNTI with a DAI in uplink index, to indicate which DAI in uplink will be used to calculate a length of an HARQ-ACK sub-codebook when the HARQ-ACK sub-codebook is generated for the corresponding G-RNTI. For example, RRC-configured association information is shown in Table 6:

TABLE 6

| Corresponding relationship between G-RNTI and UL DAI (based on RRC configuration) | | | | | | | |
|---|---|---|---|---|---|---|---|
| G-RNTI | G-RNTI-1 | G-RNTI-2 | G-RNTI-3 | G-RNTI-4 | G-RNTI-5 | G-RNTI-6 | G-RNTI-7 |
| Configure associated UL DAI | First | First | First | Second | Second | Third | Null |

In the above table, G-RNT-1/2/3 are configured to associate with a first UL DAI, and G-RNTI-4/5 are configured to associate with a second UL DAI. G-RNTI-7 is not associated with any UL DAI.

Step 3: when scheduling signaling sent by the base station for scheduling a broadcast multicast service is received, determine the number of bits of the corresponding HARQ-ACK sub-codebooks according to the corresponding relationship and the scheduling signaling.

When the terminal receives scheduling signaling DCI for scheduling a PUSCH, the DCI includes m DAIs in uplink which are used to calculate HARQ-ACK sub-codebooks of the broadcast multicast service. If m is 3, it indicates a T-DAI of 3 sub-codebooks of the broadcast multicast. A length of the HARQ-ACK sub-codebooks is calculated as follows:

A corresponding DAI in uplink value is acquired according to the corresponding relationship between the G-RNTI and the DAI in uplink. If the DAI in uplink indicates $$V_{T-DAI}^{UL} = 4,$$

and no scheduling signaling for the G-RNTI associated with the DAI in uplink is received, the terminal then does not feedback the HARQ-ACK sub-codebook, and determines that the length of the HARQ-ACK sub-codebook is 0; otherwise, the DAI in uplink is determined as the T-DAI of the HARQ-ACK sub-codebook of the broadcast multicast service corresponding to the G-RNTI, to calculate the length of the sub-codebook fed back.

In order to further illustrate the execution of this step, the following is an example. It is assumed that the corresponding relationship, obtained through step 2, between the G-RNTI and a DAI in uplink is as shown in Table 7 below:

TABLE 7

| Corresponding relationship between each G-RNTI and each UL DAI | | |
|---|---|---|
| UL DAI | Associated G-RNTI | Scheduling situation for reception |
| First broadcast multicast UL DAI = 4 | G-RNTI-1<br>G-RNTI-2 | Receive service data scheduling signaling DCI for G-RNT-1 |
| Second broadcast multicast UL DAI = 3 | G-RNTI-4<br>G-RNTI-5 | Receive service data scheduling signaling DCI for G-RNT-5 |
| Third broadcast multicast UL DAI = 4 | G-RNTI-6<br>G-RNTI-3 | Receive no scheduling signaling for both G-RNTI-6 and G-RNTI-3 |

As shown in the above table, according to the association relationship between the G-RNTI and the UL DAI, it can be seen that the scheduling DCI corresponding to G-RNTI-1 and G-RNTI-2 is associated with the first broadcast multicast service DAI in uplink=4. In actual scheduling, the service data scheduling signaling DCI of G-RNTI-1 is received. The terminal calculates the HARQ-ACK sub-codebook of the broadcast multicast service corresponding to G-RNTI-1 according to $$V_{T-DAI}^{UL} = 4;$$

according to the association relationship between the G-RNTI and the UL DAI, it can be seen that the scheduling DCI corresponding to G-RNTI-4 and G-RNTI-5 is associated with the second broadcast multicast service DAI in uplink=3. In actual scheduling, the service data scheduling signaling DCI of G-RNTI-5 is received. The terminal calculates the HARQ-ACK sub-codebook of the broadcast multicast service corresponding to G-RNTI-5 according to $$V_{T-DAI}^{UL} = 3;$$

according to the association relationship between G-RNTI and UL DAI, it can be seen that the scheduling DCI corresponding to G-RNTI-6 and G-RNTI-3 is associated with the third broadcast multicast service DAI in uplink=4. In actual scheduling, no scheduling signaling DCI is received for both G-RNTI-6 and G-RNTI-3, and $$V_{T-DAI}^{UL} = 4.$$

The terminal believes that broadcast multicast service data corresponding to these two G-RNTIs is not scheduled by the base station, that is, the HARQ-ACK sub-codebook of the HARQ is not generated, and a length of the HARQ-ACK sub-codebook is 0.

Other notes 1: if one or more G-RNTIs are not configured with a corresponding DAI in uplink, when the terminal calculates the length of the HARQ-ACK sub-codebook, it calculates the sub-codebook length according to the DAI in downlink of the received scheduling signaling. For example: if G-RNTI-7 is not configured with an associated DAI in uplink, when calculating the HARQ-ACK sub-codebook, the terminal calculates the sub-codebook length according to a DAI in downlink in the received last DCI;

Other notes 2: in order to simplify the operation, the terminal does not want to receive the scheduling of broadcast multicast services corresponding to two or more G-RNTIs in the same group, where a HARQ ACK codebook (including sub-codebooks) is generated for the broadcast multicast services corresponding to these G-RNTIs and the HARQ codebook is transmitted on the same PUSCH. That is, the terminal do not want the broadcast multicast services corresponding to G-RNTIs in a group to correspond to one DAI in uplink, as configured in the above table, both G-RNTI-1 and G-RNTI-2 are associated with the "First broadcast multicast UL DAI", and the terminal does not want to receive scheduling signaling for these two G-RNTIs at the same time. If the scheduling signaling of the broadcast multicast services corresponding to the two G-RNTIs is allowed to be received, the broadcast multicast services corresponding to the two G-RNTIs will use the DAI in uplink value to calculate the length of the corresponding sub-codebooks.

Example 2

Step 1: acquire the number of DAIs in uplink m configured by a base station for a broadcast multicast service.

It is assumed that a preset value m is fixed in a protocol, for example, m=2, it is determined as the number of DAIs in uplink for broadcast multicast services; at the same time, there are 2 DAIs in uplink for unicast services currently, and there are a total of 4 DAIs in uplink, as shown in the following table:

TABLE 8

Field information of UL DAI in scheduling signaling

| Field name | Message length | Description | Notes |
|---|---|---|---|
| First UL DAI | 2 bits | When the HARQ feedback is a dynamic HARQ-ACK codebook | Used for DAI indication for a unicast service |
| Second UL DAI | 2 bits | When the HARQ feedback is a dynamic HARQ-ACK codebook | Used for DAI indication for a unicast service |
| Third UL DAI | 2 bits | When the HARQ feedback is a dynamic HARQ-ACK codebook | Used for DAI indication for a broadcast multicast service |
| Fourth UL DAI | 2 bits | When the HARQ feedback is a dynamic HARQ-ACK codebook | Used for DAI indication for a broadcast multicast service |

Note:
the message length here is assumed to be 2 bits, and it can also be 1 bit or 3 bits or others, which is not limited here.

Step 2: determine a corresponding relationship between a HARQ-ACK sub-codebook of each broadcast multicast service and each DAI in uplink.

In this example, the corresponding relationship between each G-RNTI and each DAI in uplink is determined according to the DCI indication, and then the corresponding relationship between the HARQ-ACK sub-codebook of the broadcast multicast service corresponding to each G-RNTI and each DAI in uplink.

A bit width of the indication information in the DCI can be determined according to the number of DAIs in uplink m, as follows:

$$\text{Indication\_bits} = \lceil \log_2(m) \rceil$$

as shown in Table 8 above, if there are a total of 2 DAIs in uplink available for broadcast multicast services, and Indication_bits=1, it is then necessary to add indication information of a 1-bit length in the scheduling signaling for the broadcast multicast services, to indicate an association relationship between a HARQ-ACK sub-codebook generated for a broadcast multicast service scheduled currently and each DAI in uplink. For example, 0 represents the "Third UL DAI" in Table 8 (or a first UL DAI for the broadcast multicast), 1 represents the "Fourth UL DAI" in Table 8 (or a second UL DAI for the broadcast multicast).

In addition, if the DAI in uplink of unicast and the DAI in uplink of the broadcast multicast service are allowed to be shared, in Table 8 above, there are a total of 4 DAIs in uplink available for broadcast multicast services, and Indication_bits=2, it is then necessary to add indication information of a 2-bit length in the scheduled broadcast multicast service, to indicate an association relationship between the HARQ-ACK sub-codebook generated for the broadcast multicast service scheduled currently and each DAI in uplink.

Step 3: when scheduling signaling, sent by the base station, for scheduling a broadcast multicast service is received, determine the number of bits of the corresponding HARQ-ACK sub-codebooks according to the corresponding relationship and the scheduling signaling.

When the terminal receives the scheduling signaling DCI for scheduling a PUSCH, the DCI includes m DAIs in uplink which are used to calculate HARQ-ACK sub-codebooks of the broadcast multicast. If m is 4, it indicates a T-DAI of 4

HARQ-ACK sub-codebooks of the broadcast multicast. A length of the HARQ-ACK sub-codebooks is calculated as follows:

A corresponding DAI in uplink value is acquired according to the corresponding relationship between the G-RNTI and the DAI in uplink. If the DAI in uplink indicates $$V_{T-DAI}^{UL} = 4,$$

and no scheduling signaling for the G-RNTI associated with the DAI in uplink is received, the terminal does not feedback the HARQ-ACK sub-codebook, and determines that the length of the HARQ-ACK sub-codebook is 0; otherwise, the DAI in uplink is determined as the T-DAI of the HARQ-ACK sub-codebook of the broadcast multicast service corresponding to the G-RNTI, to calculate the length of the HARQ-ACK sub-codebook fed back.

Other notes 1: when the DCI scheduling signaling of the broadcast multicast service does not indicate the corresponding relationship between the broadcast multicast service G-RNTI scheduled this time and the DAI in uplink, one of the following two methods can be used: 1) correspond to a DAI in uplink by default; 2) when calculating the HARQ-ACK sub-codebook, calculate the length of the corresponding sub-codebook according to a DAI in downlink in a received last DCI.

Other Note 2: for different pieces of scheduling signaling of the same HARQ-ACK sub-codebook of the same broadcast multicast service, if the corresponding relationships of the DAI in uplink indicated in the pieces of DCI scheduling signaling are inconsistent, a corresponding relationship of the DAI in uplink indicated in the last scheduling signaling is used.

This example is advantageous over Example 1 in that an arbitrary number of m services can be scheduled among all configured broadcast multicast services, where a same HARQ-ACK codebook (including m sub-codebooks) can be generated for the m services, and the HARQ-ACK codebook is transmitted on the same PUSCH.

Example 3

Step 1: acquire the number of DAIs in uplink m configured by a base station for a broadcast multicast service. (Same as Example 1)

The base station configures, through high-layer signaling, an identifier G-RNTI of a broadcast multicast service that needs HARQ-ACK feedback. If n different G-RNTIs are configured, they are: G-RNTI-1, G-RNTI-2 . . . G-RNTI-n, respectively. In addition, a preset threshold value K can also be determined through a protocol. The number of DAIs in uplink m is determined according to the following formula:

$$m = n, \text{ when } n \le K;$$

$$m = k, \text{ when } n > K;$$

for example, assuming K=2, when n=1, the number of DAIs in uplink m=n=1; when n=10, m=K=2.

Furthermore, after the number of DAIs in uplink is determined, field information of the DAI in uplink for broadcast multicast in the scheduling signaling can be as shown in Table 9.

TABLE 9

Field information of DAI in uplink for broadcast multicast in scheduling signaling

| Field name | Message length | Description | Notes |
|---|---|---|---|
| First broadcast multicast DAI | 2 bits | When the HARQ feedback is a dynamic HARQ-ACK codebook (dynamic HARQ-ACK codebook) | Used for DAI indication for a broadcast multicast service |
| Second broadcast multicast DAI | 2 bits | When the HARQ feedback is a dynamic HARQ-ACK codebook (dynamic HARQ-ACK codebook) | Used for DAI indication for a broadcast multicast service |

Note: the message length here is assumed to be 2 bits, and it can also be 1 bit or 3 bits or others, which is not limited here.

Step 2: determine a corresponding relationship between a HARQ-ACK sub-codebook of each broadcast multicast service and each DAI in uplink.

In this example, the corresponding relationship between each G-RNTI and each DAI in uplink is determined according to a default rule, and then the corresponding relationship between the HARQ-ACK sub-codebook of the broadcast multicast service corresponding to each G-RNTI and each DAI in uplink can be determined, as follows:

Receive scheduling signaling sent by the base station for the broadcast multicast service; for scheduling signaling in one or more broadcast multicast services scheduled currently, establish a corresponding relationship between a G-RNTI of the one or more broadcast multicast services scheduled currently and each DAI in uplink sequentially in an ascending order of the G-RNTI.

For example: when the terminal receives scheduling signaling for 2 broadcast multicast services (G-RNTI-1=1 and G-RNTI-3=3) from the base station, two HARQ-ACK sub-codebooks need to be generated. The terminal makes a correspondence with DAIs in uplink in an ascending order of the G-RNTIs. That is, a first DAI in uplink corresponds to G-RNTI-1, and a second DAI in uplink corresponds to G-RNTI-3.

For another example: when the terminal receives scheduling signaling for 2 broadcast multicast services (G-RNTI-3=3 and G-RNTI-5=5) from the base station, two HARQ-ACK sub-codebooks need to be generated. The terminal makes a correspondence with DAIs in uplink in an ascending order of the G-RNTIs. That is, a first DAI in uplink corresponds to G-RNTI-3, and a second DAI in uplink corresponds to G-RNTI-5.

Of course, In one embodiment, in the example, a corresponding relationship between the G-RNTI(s) of the one or more broadcast multicast services scheduled currently and each DAI in uplink may also be established in a descending order.

When the base station only schedules downlink data of one broadcast multicast service, one of DAIs in uplink is set according to an actual scheduled T-DAI, and other DAIs in uplink are set to $$V_{T-DAI}^{UL}=4.$$

When the terminal side receives DAI in uplink values, the terminal side sequentially searches for a DAI in uplink that is not equal to 4. If all the DAIs in uplink are 4, the terminal carries out processing based on $$V_{T-DAI}^{UL}=4$$

as follows (see step 3).

This example is advantageous in that there is no need for the base station to configure the contents in step 2 of example 1, but is disadvantageous in that an error in HARQ-ACK sub-codebook calculation will be incurred when the scheduling information of the broadcast multicast service corresponding to a certain G-RNTI is lost in entirety.

Step 3: when scheduling signaling, sent by the network device, for scheduling a broadcast multicast service is received, determine the number of bits of the corresponding HARQ-ACK sub-codebooks according to the corresponding relationship and the scheduling signaling (same as Example 1).

When the terminal receives scheduling signaling DCI for scheduling a PUSCH, the DCI includes m DAIs in uplink which are used to calculate HARQ-ACK sub-codebooks of the broadcast multicast. If m is 2, it indicates a T-DAI of 2 HARQ-ACK sub-codebooks of the broadcast multicast service. A length of the HARQ-ACK sub-codebooks is calculated as follows:

A corresponding DAI in uplink value is acquired according to the corresponding relationship between the G-RNTI and the DAI in uplink. If the DAI in uplink indicates $$V_{T-DAI}^{UL}=4,$$

and no scheduling signaling for the G-RNTI associated with the DAI in uplink is received, the terminal then does not feedback the HARQ-ACK sub-codebook, and determines that the length of the HARQ-ACK sub-codebook is 0; otherwise, the DAI in uplink is determined as the T-DAI of the HARQ-ACK sub-codebook of the broadcast multicast service corresponding to the G-RNTI, to calculate the length of the HARQ-ACK sub-codebook fed back.

Other notes: due to limitation of the number of DAIs in uplink m, when the base station schedules broadcast multicast services, what should be avoided is to transmit more than m HARQ-ACK codebooks including HARQ-ACK sub-codebooks of the broadcast multicast services on a same PUSCH. When the number of broadcast multicast services scheduled by the base station is greater than m, there is no broadcast multicast service corresponding to the DAI in uplink. When calculating the length of the HARQ-ACK sub-codebook, the DAI in uplink value is calculated according to a DAI in downlink in the scheduling signaling DCI.

Example 4

In Examples 1 to 3, it is assumed that the DAI in uplink and the DAI in downlink have a bit width bit_width=2 bits (that is, a maximum value is indicated to be 4), for each piece of DCI scheduling information, at most one piece of PDSCH data is scheduled at a time, and a DAI counting process in which up to 3 consecutive DCIs are missed can be solved.

In the embodiment, it is assumed that when the bit width is greater than 2 (such as: 2+M, M>=1), the DAI in uplink indication method is described. It should be noted here that only the bit width of the DAI in uplink increases, and other processes can remain unchanged. That is, steps 1 and 2 are the same as the above examples, and the only difference in step 3 is the DAI in uplink data.

When the bit width of the DAI in uplink is bit_width=2+M, it represents that up to $2^M$ PDSCHs can be scheduled for a piece of downlink DCI scheduling information. The DAI in uplink then represents that "a T-DAI count value of a last PDSCH among PDSCHs" is scheduled for "a last piece of downlink DCI scheduling information", the DAI in uplink counting method is shown in FIG. 6.

Figure 6:
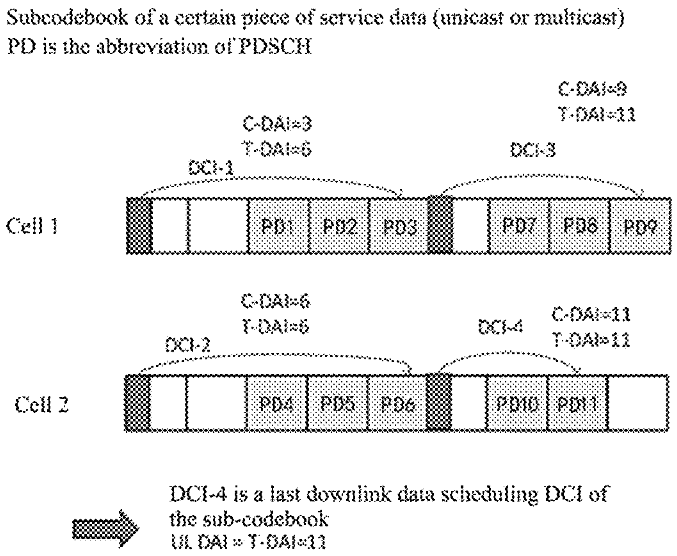
FIG. 6 is a schematic diagram of a value of a DAI in uplink provided by an embodiment of the present disclosure.

As shown in FIG. 6: it is assumed that M=2, that is, up to 4 PDSCHs can be scheduled for each DCI. The bit width of the DAI in uplink is 4 bits, and correspondingly, the bit width of the DAI in downlink is also 4 bits. In downlink scheduling, both the C-DAI counting method and the T-DAI counting method carry out docketing to "a last PDSCH among PDSCHS scheduled for a current DCI", for example:

In DCI-1, 3 PDSCHs are scheduled, C-DAI=3 (instead of 1);

In DCI-2, 3 PDSCHs are scheduled, C-DAI=6 (instead of 4), T-DAI=6 (instead of 4);

In DCI-4, 2 PDSCHs are scheduled, C-DAI=11 (instead of 10), and T-DAI=11 (instead of 10).

For the T-DAI value of DCI-4 represented by the DAI in uplink, also, "a T-DAI count value of a last PDSCH among PDSCHs" is scheduled for "a last piece of downlink DCI scheduling information", that is, the DAI in uplink=11.

Other notes 1: in actual standardization, for a downlink C-DAI or/and a T-DAI, scheduling may be performed according to "a T-DAI count value of a first PDSCH among PDSCHS". For example, in DCI-4, C-DAI=10, and T-DAI=10. Then, it is necessary to add the number of PDSCHs actually scheduled for the current DCI and to subtract 1, when calculating the length of the HARQ-ACK sub-codebook. For example, in DCI-4, although in the scheduling signaling indication T-DAI=10, actually T-DAI=10+2−1=11. In this case, a rule of scheduling "a T-DAI count value of a last PDSCH among PDSCHs" still needs to be maintained for the DAI in uplink, because if terminal misses DCI-4, the terminal cannot know the number of PDSCHs scheduled for DCI-4.

Further: in the above embodiments, for the operation process of the DAI and HARQ-ACK codebook of the identifier G-RNTI of the broadcast multicast service, that is, including an identifier G-RNTI (Group common Radio Network Temporary Identity) used for dynamic scheduling of a broadcast multicast service, and an identifier G-CS-RNTI (Group Configured Scheduling-RNTI) used for semi-static persistent group scheduling, when the base station configures broadcast multicast services to support the semi-static persistent group scheduling, the base station can configure one or more G-CS-RNTIs for the terminal. The above embodiment is applied to the G-CS-RNTI and may include one of the following methods:

1: a specific G-CS-RNTI and a specific G-RNTI are associatively applied in the above embodiment. For example:

a base station indicates an association relationship between a G-CS-RNTI and a G-RNTI through high-layer signaling (such as an RRC message). For example: G-CS-RNTI-1 is associated with G-RNTI-1.

For downlink group scheduling signaling, when G-RNTI configuration is dynamic HARQ codebook feedback, in corresponding scheduling signaling scrambled with G-CS-RNTI-1 and G-RNTI-1, joint counting is indicated for the DAI in downlink (that is, a HARQ-ACK sub-codebook A is generated for scheduling signaling of two RNTIs). For example, in time slot 1, the terminal receives G-CS-RNTI-1 scrambled DCI, and its DAI is 1; in time slot 2, the terminal receives G-RNTI-1 scrambled DCI, and its DAI is 2.

For uplink unicast scheduling signaling, in the above embodiments, it is determined that the DAI in uplink corresponding to G-RNTI-1 is used to calculate a length of the above HARQ-ACK sub-codebook A.

2: separate DAI counting is performed for a specific G-CS-RNTI, that is, a

HARQ-ACK subcode is generated separately. For example:

for downlink group scheduling signaling, when G-CS-RNTI configuration is dynamic HARQ codebook feedback, in corresponding G-CS-RNTI scheduling signaling, separate counting is indicated for the DAI in downlink (that is, a HARQ-ACK sub-codebook B is generated separately), whether to generate a HARQ-ACK sub-codebook and a length of the sub-codebook is determined according to a DAI-related process. The relevant process is the same as the G-RNTI, which will not be repeated here.

For uplink unicast scheduling signaling, in the above embodiments, G-CS-RNTI-1 needs to be used as a special G-RNTI to determine a corresponding DAI in uplink, for calculating a length of the above HARQ-ACK sub-codebook B. For example: when G-RNT-1, G-RNTI-2, and G-CS-RNTI-1 are configured, which is equivalent to configuring three G-RNTIs, a corresponding relationship between the G-RNTIs and the uplink-DAI is determined. Examples are as follows:

it is assumed that the base station configures a DAI in uplink for broadcast multicast, the UL DAI can be applied to a codebook generation process of G-RNT-1, or G-RNTI-2, or G-CS-RNTI-1;

it is assumed that the base station configures two or more DAIs in uplink for broadcast multicast, corresponding relationships between "G-RNT-1, G-RNTI-2, G-CS-RNTI-1" and the uplink UL DAIs are determined respectively. The determining method can be applied to any embodiment of the above embodiments.

3: when the base station configures G-CS-RNTIs, each G-CS-RNTI can adopt separate DAI counting, or be associated with a specific G-RNTI to use a joint DAI counting method, which is determined by a protocol or the base station configuration.

Embodiment 7

Figure 7:
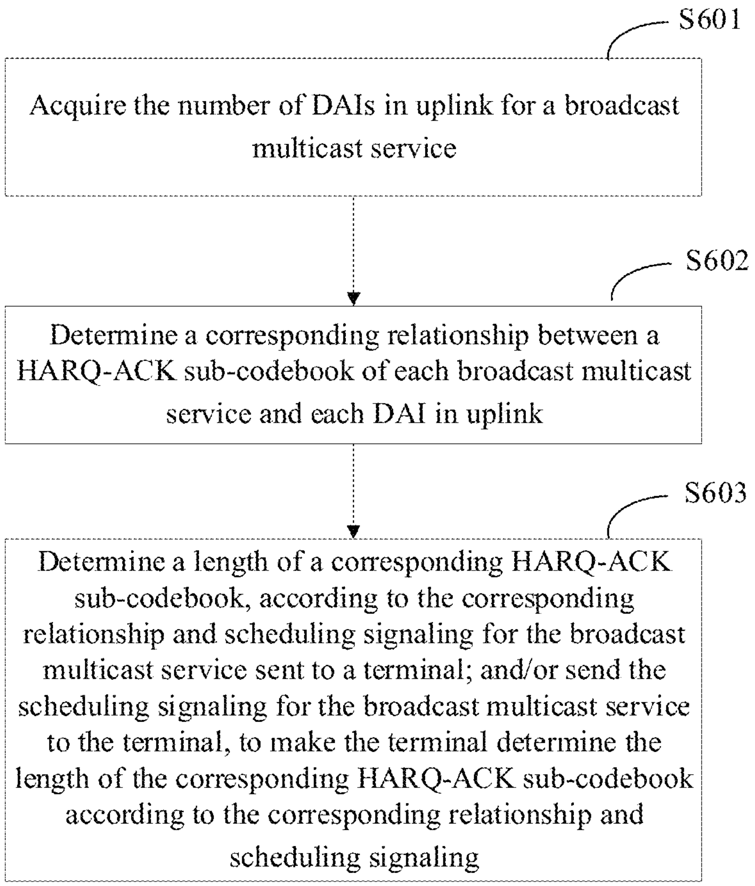
FIG. 7 is a flowchart of a DAI in uplink indication method provided by another embodiment of the present disclosure.

FIG. 7 is a flowchart of a DAI in uplink indication method provided by this embodiment. As shown in FIG. 7, this embodiment provides a DAI in uplink indication method. The execution subject is a network device. Specific steps of the DAI in uplink indication method are as follows:

S601, acquire the number of DAIs in uplink for broadcast multicast services;

S602, determine a corresponding relationship between a HARQ-ACK sub-codebook of each broadcast multicast service and each DAI in uplink.

S603, determine the number of bits of the corresponding HARQ-ACK sub-codebooks, according to the corresponding relationship and scheduling signaling sent to a terminal for a broadcast multicast service; and/or send the scheduling signaling for scheduling the broadcast multicast service to the terminal, to make the terminal determine the length of the corresponding HARQ-ACK sub-codebook according to the corresponding relationship and the scheduling signaling.

In one embodiment, the acquiring the number of DAIs in uplink for the broadcast multicast service includes:

acquiring the number of broadcast multicast services and a preset threshold value;

determining the number of DAIs in uplink according to the number of broadcast multicast services and the preset threshold value.

In one embodiment, the determining the number of DAIs in uplink according to the number of broadcast multicast services and the preset threshold value includes:

if the number of broadcast multicast services is less than or equal to the preset threshold value, determining that the number of DAIs in uplink is equal to the number of broadcast multicast services; or if the number of broadcast multicast services is greater than the preset threshold value, determining that the number of DAIs in uplink is equal to the preset threshold value.

In one embodiment, the determining the number of DAIs in uplink according to the number of broadcast multicast services and the preset threshold value includes:

acquiring a ratio of the number of broadcast multicast services to the preset threshold value, rounding the ratio, and determining a rounded result as the number of DAIs in uplink.

In one embodiment, the acquiring the number of DAIs in uplink for the broadcast multicast service includes:

acquiring a preset value, and determine the preset value as the number of DAIs in uplink.

In one embodiment, the determining the corresponding relationship between the HARQ-ACK sub-codebook of each broadcast multicast service and each DAI in uplink includes:

determining, according to an identifier G-RNTI of each broadcast multicast service, a corresponding relationship between each G-RNTI and each DAI in uplink;

determining a corresponding relationship between a HARQ-ACK sub-codebook of a broadcast multicast service corresponding to each G-RNTI and each DAI in uplink, according to the corresponding relationship between each G-RNTI and each DAI in uplink.

In one embodiment, the determining, according to the identifier G-RNTI of each broadcast multicast service, the corresponding relationship between each G-RNTI and each DAI in uplink includes:

performing a modulo operation on each G-RNTI to the number of DAIs in uplink, determining G-RNTIs with a same modulo result as a G-RNTI group, and establishing a corresponding relationship between the G-RNTI group and a DAI in uplink having a sequence number equal to the modulo result.

In one embodiment, the determining, according to the identifier G-RNTI of each broadcast multicast service, the corresponding relationship between each G-RNTI and each DAI in uplink includes:

acquiring high-layer signaling sent to the terminal, where the high-layer signaling includes a corresponding relationship between each G-RNTI and each DAI in uplink preset by the network device when pre-configuring the broadcast multicast service;

determining, according to the high-layer signaling, the corresponding relationship between each G-RNTI and each DAI in uplink.

In one embodiment, the method further includes:

if for any broadcast multicast service, the high-layer signaling does not include the corresponding relationship between the G-RNTI of the broadcast multicast service and each DAI in uplink, determining the length of the corresponding HARQ-ACK sub-codebook according to a DAI in downlink included in the scheduling signaling sent to the terminal for the broadcast multicast service.

In one embodiment, the determining, according to the identifier G-RNTI of each broadcast multicast service, the corresponding relationship between each G-RNTI and each DAI in uplink includes:

acquiring scheduling signaling sent to the terminal for any one or more broadcast multicast services, where the scheduling signaling includes indication information, the indication information is used to indicate a DAI in uplink corresponding to a G-RNTI of one or more broadcast multicast services scheduled currently;

determining the corresponding relationship between each G-RNTI and each DAI in uplink according to the indication information of the scheduling signaling.

In one embodiment, the determining the corresponding relationship between each G-RNTI and each DAI in uplink according to the scheduling signaling includes:

if for a same HARQ-ACK sub-codebook of any broadcast multicast service, plural pieces of scheduling signaling need to be sent to the terminal, and indication information in each piece of scheduling signaling indicates a different DAI in uplink corresponding to the G-RNTI of the one or more broadcast multicast services scheduled currently, determining a corresponding relationship between the G-RNTI of the one or more broadcast multicast services scheduled currently and the DAI in uplink, based on indication information of a last piece of scheduling signaling.

In one embodiment, determining the corresponding relationship between each G-RNTI and each DAI in uplink according to the scheduling signaling includes:

if the scheduling signaling does not indicate the DAI in uplink corresponding to the G-RNTI of the one or more broadcast multicast services scheduled currently, corresponding the G-RNTI of the one or more broadcast multicast services scheduled currently to a default DAI in uplink; or where the method further includes:

if the scheduling signaling does not indicate the DAI in uplink corresponding to the G-RNTI of the one or more broadcast multicast services scheduled currently, determining the length of the corresponding HARQ-ACK sub-codebook according to a DAI in downlink included in a last piece of scheduling signaling received for the broadcast multicast service.

In one embodiment, the determining, according to the identifier G-RNTI of each broadcast multicast service, the corresponding relationship between each G-RNTI and each DAI in uplink includes:

acquiring scheduling signaling sent to the terminal for the broadcast multicast service;

for one or more broadcast multicast services scheduled currently, establishing a corresponding relationship between a G-RNTI of the one or more broadcast multicast services scheduled currently and each DAI in uplink sequentially in a predetermined order of the G-RNTI.

In one embodiment, when establishing the corresponding relationship between the G-RNTI of the one or more broadcast multicast services scheduled currently and each DAI in uplink sequentially in the predetermined order of G-RNTI includes:

establishing the corresponding relationship between the G-RNTI of the one or more broadcast multicast services scheduled currently and each DAI in uplink sequentially, in an ascending order or a descending order of the G-RNTI of the one or more broadcast multicast services scheduled currently.

In one embodiment, the determining the length of the corresponding HARQ-ACK sub-codebook, according to the corresponding relationship and the scheduling signaling sent to the terminal for the broadcast multicast service includes:

determining a value of each DAI in uplink according to the corresponding relationship and uplink DAI information included in the scheduling signaling;

determining, according to the value of each DAI in uplink, a length of a HARQ-ACK sub-codebook scheduled currently corresponding to each DAI in uplink.

In one embodiment, the determining, according to the value of each DAI in uplink, the length of the HARQ-ACK sub-codebook scheduled currently corresponding to each DAI in uplink includes:

for any DAI in uplink, determining whether the terminal feeds back the corresponding HARQ-ACK sub-codebook, according to a value of the DAI in uplink and whether to send scheduling signaling for scheduling each broadcast multicast service corresponding to the DAI in uplink to the terminal;

if it is determined that the terminal does not feedback the corresponding HARQ-ACK sub-codebook, determining that the length of the corresponding HARQ-ACK sub-codebook scheduled currently is 0; or if it is determined that the terminal feeds back the corresponding HARQ-ACK sub-codebook, determining, according to the value of the DAI in uplink, the length of the corresponding HARQ-ACK sub-codebook scheduled currently.

In one embodiment, the determining the length of the corresponding HARQ-ACK sub-codebook, according to the corresponding relationship and the scheduling signaling sent to the terminal for the broadcast multicast service includes:

if the scheduling signaling does not include uplink DAI information corresponding to the HARQ-ACK sub-codebook scheduled currently, determining, according to a DAI in downlink included in the scheduling signaling, the length of the HARQ-ACK sub-codebook scheduled currently.

In one embodiment, the method further includes:

determining a length of a HARQ-ACK codebook according to a length of each HARQ-ACK sub-codebook.

The DAI in uplink indication method provided by the embodiment is a method corresponding to the network device side in the method of the above embodiments, its implementation method and effect are similar to those on the terminal side. Please refer to the above terminal side embodiment.

In one embodiment, the method further includes:

acquiring network configuration, where the network configuration includes an identifier G-RNTI used for dynamic scheduling of a broadcast multicast service and/or an identifier G-CS-RNTI used for semi-static persistent group scheduling.

In one embodiment, if the network device configures the broadcast multicast service to support the semi-static persistent group scheduling, the network configuration includes one or more G-CS-RNTIs.

In one embodiment, the network configuration includes a G-CS-RNTI and a G-RNTI that are associated with each other; the method further includes:

for downlink group scheduling signaling, when G-RNTI configuration is dynamic HARQ codebook feedback, in corresponding scheduling signaling scrambled with the G-CS-RNTI and the associated G-RNTI, indicating that joint counting is used for a DAI in downlink; or for uplink unicast scheduling signaling, determining from the G-CS-RNTI and the associated G-RNTI, a DAI in uplink corresponding to the G-RNTI, to determine the length of the HARQ-ACK sub-codebook.

In one embodiment, the method further includes:

sending high-layer signaling to the terminal, where the high-layer signaling includes an association relationship between the G-CS-RNTI and the G-RNTI that are associated with each other.

In one embodiment, the network configuration includes one or more G-CS-RNTIs; the method further includes:

for downlink group scheduling signaling, when G-CS-RNTI configuration is dynamic HARQ codebook feedback, in corresponding G-CS-RNTI scheduling signaling, using separate counting for a DAI in downlink, determining, according to a DAI-related technical value, whether to generate the HARQ-ACK sub-codebook and the length of the sub-codebook; or for uplink unicast scheduling signaling, determining a corresponding DAI in uplink by using the G-CS-RNTI following a method for the G-RNTI, to determine the length of the HARQ-ACK sub-codebook.

In one embodiment, the network configuration includes G-CS-RNTIs; the method further includes:

using separate DAI counting for each G-CS-RNT, or associating with a specific G-RNTI to use a joint DAI counting.

Embodiment 8

Figure 8:
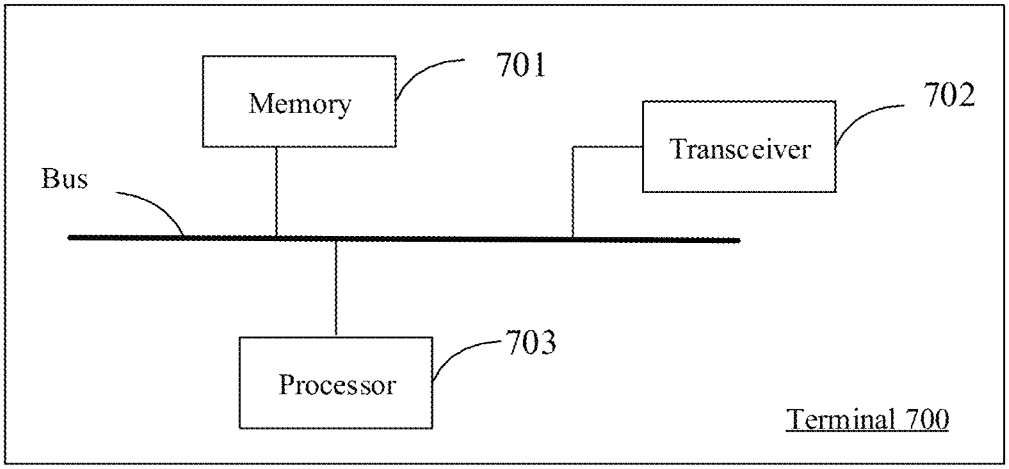
FIG. 8 is a structural diagram of a terminal provided by an embodiment of the present disclosure.

FIG. 8 is a structural diagram of a terminal device provided by an embodiment of the present disclosure. The terminal device provided by the embodiment can execute the processing flow provided by the method embodiment. As shown in FIG. 8, the terminal device 700 includes a memory 701, a transceiver 702, and a processor 703.

In FIG. 8, the bus architecture may include any number of interconnected buses and bridges, specifically linked together by various circuits of one or more processors represented by the processor 703 and one or more memories represented by the memory 701. The bus architecture may also link various other circuits together, such as peripherals, voltage regulators, and power management circuits, which are well known in the art and therefore will not be further described herein. The bus interface provides an interface. The transceiver 702 may be elements, that is, including a transmitter and a receiver, and provides a unit for communicating with various other apparatuses over a transmission medium, which includes a transmission medium such as a wireless channel, a wired channel, a fiber optic cable, etc. The processor 701 is responsible for managing the bus architecture and usual processing, and the memory 703 may store data used by the processor 703 when performing operations.

The processor 703 may be a central processing unit (CPU), an application specific integrated circuit (ASIC), a field-programmable gate array (FPGA), or a complex programmable logic device (CPLD). The processor may also have a multi-core architecture.

The memory 701 is configured to store a computer program; the transceiver 702 is configured to send and receive data under control of the processor 703; and the processor 703 is configured to read the computer program in the memory 701 and execute following operations:

acquiring the number of DAIs in uplink configured by a network device for broadcast multicast services;

determining a corresponding relationship between a HARQ-ACK sub-codebook of each broadcast multicast service and each DAI in uplink;

determining the number of bits of the corresponding HARQ-ACK sub-codebooks, according to the corresponding relationship and scheduling signaling received from the network device for a broadcast multicast service.

In one embodiment, the processor 703, when acquiring the number of DAIs in uplink configured by the network device for the broadcast multicast services, is configured to: acquire the number of broadcast multicast services and a preset threshold value configured by the network device;

determine the number of DAIs in uplink according to the number of broadcast multicast services and the preset threshold value.

In one embodiment, the processor 703, when determining the number of DAIs in uplink according to the number of broadcast multicast services and the preset threshold value, is configured to:

if the number of broadcast multicast services is less than or equal to the preset threshold value, determining that the number of DAIs in uplink is equal to the number of broadcast multicast services; or if the number of broadcast multicast services is greater than the preset threshold value, determine that the number of DAIs in uplink is equal to the preset threshold value.

In one embodiment, the processor 703, when determining the number of DAIs in uplink according to the number of broadcast multicast services and the preset threshold value, is configured to:

acquire a ratio of the number of broadcast multicast services to the preset threshold value, round the ratio, and determine a rounded result as the number of DAIs in uplink.

In one embodiment, the processor 703, when acquiring the number of DAIs in uplink preset by the network device for the broadcast multicast service, is configured to: acquire a preset value configured by the network device, and determine the preset value as the number of DAIs in uplink.

In one embodiment, the processor 703, when determining the corresponding relationship between the HARQ-ACK sub-codebook of each broadcast multicast service and each DAI in uplink, is configured to:

determine, according to an identifier G-RNTI of each broadcast multicast service, a corresponding relationship between each G-RNTI and each DAI in uplink;

determine a corresponding relationship between a HARQ-ACK sub-codebook of a broadcast multicast service corresponding to each G-RNTI and each DAI in uplink, according to the corresponding relationship between each G-RNTI and each DAI in uplink.

In one embodiment, when determining, according to the identifier G-RNTI of each broadcast multicast service, the corresponding relationship between each G-RNTI and each DAI in uplink, the processor 703 is configured to:

perform a modulo operation on each G-RNTI to the number of DAIs in uplink, determine G-RNTIs with a same modulo result as a G-RNTI group, and establish a corresponding relationship between the G-RNTI group and a DAI in uplink having a sequence number equal to the modulo result.

In one embodiment, the processor 703, when determining the corresponding relationship between each G-RNTI and each DAI in uplink according to the identifier G-RNTI of each broadcast multicast service, is configured to:

determine the corresponding relationship between each G-RNTI and each DAI in uplink according to high-layer signaling sent by the network device received in advance, where the high-layer signaling includes the corresponding relationship between each G-RNTI and each DAI in uplink preset by the network device when pre-configuring the broadcast multicast service.

In one embodiment, the processor 703 is further configured to:

if for any broadcast multicast service, the high-layer signaling does not include the corresponding relationship between the G-RNTI of the broadcast multicast service and each DAI in uplink, determine the length of the corresponding HARQ-ACK sub-codebook according to a DAI in downlink included in a last piece of scheduling signaling received for the broadcast multicast service.

In one embodiment, when determining, according to the identifier G-RNTI of each broadcast multicast service, the corresponding relationship between each G-RNTI and each DAI in uplink, the processor 703 is configured to:

receive scheduling signaling sent by the network device for any one or more broadcast multicast services, where the scheduling signaling includes indication information, the indication information is used to indicate a DAI in uplink corresponding to a G-RNTI of one or more broadcast multicast services scheduled currently;

determine the corresponding relationship between each G-RNTI and each DAI in uplink according to the indication information of the scheduling signaling.

In one embodiment, the processor 703, when determining the corresponding relationship between each G-RNTI and each DAI in uplink according to the scheduling signaling, is configured to:

if for a same HARQ-ACK sub-codebook of any broadcast multicast service, plural pieces of scheduling signaling sent by the network device are received, and indication information in each piece of scheduling signaling indicates a different DAI in uplink corresponding to the G-RNTI of the one or more broadcast multicast services scheduled currently, determine a corresponding relationship between the G-RNTI of the one or more broadcast multicast services scheduled currently and the DAI in uplink, based on indication information of a last piece of scheduling signaling.

In one embodiment, the processor 703, when determining the corresponding relationship between each G-RNTI and each DAI in uplink according to the scheduling signaling, is configured to:

if the scheduling signaling does not indicate the DAI in uplink corresponding to the G-RNTI of the one or more broadcast multicast services scheduled currently, correspond the G-RNTI of the one or more broadcast multicast services scheduled currently to a default DAI in uplink; or the processor 703 is further configured to:

if the scheduling signaling does not indicate the DAI in uplink corresponding to the G-RNTI of the one or more broadcast multicast services scheduled currently, determine the length of the corresponding HARQ-ACK sub-codebook according to a DAI in downlink included in a last piece of scheduling signaling received for the broadcast multicast service.

In one embodiment, when determining, according to the identifier G-RNTI of each broadcast multicast service, the corresponding relationship between each G-RNTI and each DAI in uplink, the processor 703 is configured to:

receive scheduling signaling sent by the network device for the broadcast multicast service;

for one or more broadcast multicast services scheduled currently, establish a corresponding relationship between a G-RNTI of the one or more broadcast multicast services scheduled currently and each DAI in uplink sequentially in a predetermined order of the G-RNTI.

In one embodiment, the processor 703, when establishing the corresponding relationship between the G-RNTI of one or more broadcast multicast services scheduled currently and each DAI in uplink sequentially in the predetermined order of G-RNTI, is configured to:

establish the corresponding relationship between the G-RNTI of the one or more broadcast multicast services scheduled currently and each DAI in uplink sequentially, in an ascending order or a descending order of the G-RNTI of the one or more broadcast multicast services scheduled currently.

In one embodiment, the processor 703, when determining the number of bits of the corresponding HARQ-ACK sub-codebooks according to the corresponding relationship and the scheduling signaling received from the network device for the broadcast multicast service, is configured to:

determine a value of each DAI in uplink according to the corresponding relationship and uplink DAI information included in the scheduling signaling;

determine, according to the value of each DAI in uplink, a length of a HARQ-ACK sub-codebook scheduled currently corresponding to each DAI in uplink.

In one embodiment, the processor 703, when determining, according to the value of each DAI in uplink, the length of the HARQ-ACK sub-codebook scheduled currently corresponding to each DAI in uplink, is configured to:

for any DAI in uplink, determine whether to feedback the corresponding HARQ-ACK sub-codebook, according to a value of the DAI in uplink and whether scheduling signaling for scheduling each broadcast multicast service corresponding to the DAI in uplink is received;

if it is determined not to feedback the corresponding HARQ-ACK sub-codebook, determine that the length of the corresponding HARQ-ACK sub-codebook scheduled currently is 0; or if it is determined to feedback the corresponding HARQ-ACK sub-codebook, determine, according to the value of the DAI in uplink, the length of the corresponding HARQ-ACK sub-codebook scheduled currently.

In one embodiment, the processor 703, when determining a length of a corresponding HARQ-ACK sub-codebook, according to the corresponding relationship and the scheduling signaling received from the network device for the broadcast multicast service, is configured to:

if the scheduling signaling does not include uplink DAI information corresponding to the HARQ-ACK sub-codebook scheduled currently, determine, according to a DAI in downlink included in the scheduling signaling, the length of the HARQ-ACK sub-codebook scheduled currently.

In one embodiment, the processor 703 is further configured to:

determine a length of a HARQ-ACK codebook according to a length of each HARQ-ACK sub-codebook.

In one embodiment, the processor 703 is further configured to:

acquire network configuration, where the network configuration includes an identifier G-RNTI used for dynamic scheduling of a broadcast multicast service and/or an identifier G-CS-RNTI used for semi-static persistent group scheduling.

In one embodiment, if the network device configures the broadcast multicast service to support the semi-static persistent group scheduling, the network configuration includes one or more G-CS-RNTIs.

In one embodiment, the network configuration includes a G-CS-RNTI and a G-RNTI that are associated with each other; the processor 703 is further configured to:

for downlink group scheduling signaling, when G-RNTI configuration is dynamic HARQ codebook feedback, in corresponding scheduling signaling scrambled with the G-CS-RNTI and the associated G-RNTI, indicate that joint counting is used for a DAI in downlink; or for uplink unicast scheduling signaling, determine from the G-CS-RNTI and the associated G-RNTI, a DAI in uplink corresponding to the G-RNTI, to determine the length of the HARQ-ACK sub-codebook.

In one embodiment, the processor 703 is further configured to:

determine, according to high-layer signaling sent by the network device, an association relationship between the G-CS-RNTI and the G-RNTI that are associated with each other.

In one embodiment, the network configuration includes one or more G-CS-RNTIs; the processor 703 is further configured to:

for downlink group scheduling signaling, when G-CS-RNTI configuration is dynamic HARQ codebook feedback, in corresponding G-CS-RNTI scheduling signaling, use separate counting for a DAI in downlink, determine, according to a DAI-related technical value, whether to generate the HARQ-ACK sub-codebook and the length of the sub-codebook; or for uplink unicast scheduling signaling, determining a corresponding DAI in uplink by using the G-CS-RNTI following a terminal for the G-RNTI, to determine the length of the HARQ-ACK sub-codebook.

In one embodiment, the network configuration includes G-CS-RNTIs; the processor 703 is further configured to:

use separate DAI counting for each G-CS-RNT, or associate with a specific G-RNTI to use a joint DAI counting.

The terminal device provided by the embodiments of the present disclosure can be specifically configured to execute the terminal side method embodiments provided by the above embodiments, and the specific functions will not be repeated here.

Embodiment 9

Figure 9:
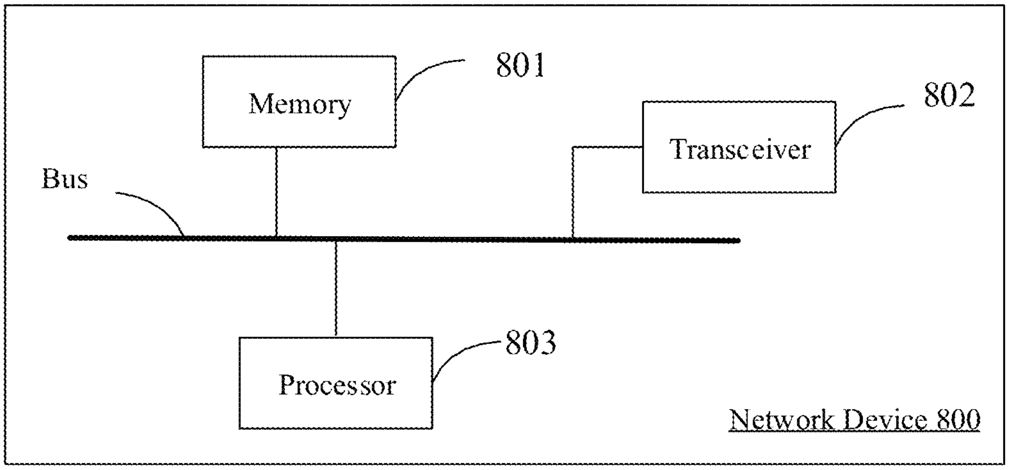
FIG. 9 is a structural diagram of a network device provided by an embodiment of the present disclosure.

FIG. 9 is a structural diagram of a network device provided by an embodiment of the present disclosure. The network device provided by the embodiment can execute the processing flow provided by the method embodiment. As shown in FIG. 9, the network device 800 includes a memory 801, a transceiver 802, and a processor 803.

In FIG. 9, the bus architecture may include any number of interconnected buses and bridges, specifically linked together by various circuits of one or more processors 803 represented by the processor 803 and one or more memories 801 represented by the memory 801. The bus architecture may also link various other circuits together, such as peripherals, voltage regulators, and power management circuits, which are well known in the art and therefore will not be further described herein. The bus interface provides an interface. The transceiver 802 may be elements, that is, including a transmitter and a receiver, and provides a unit for communicating with various other apparatuses over a transmission medium, which includes a transmission medium such as a wireless channel, a wired channel, a fiber optic cable, etc. The processor 803801 is responsible for managing the bus architecture and usual processing, and the memory 803 may store data used by the processor 803 when performing operations.

The processor 803 may be a central processing unit (CPU), an application specific integrated circuit (ASIC), a field-programmable gate array (FPGA), or a complex programmable logic device (CPLD). The processor 803 may also have a multi-core architecture.

The memory 801 is configured to store a computer program; the transceiver 802 is configured to send and receive data under control of the processor 803; and the processor 803 is configured to read the computer program in the memory 801 and execute following operations:

acquiring the number of DAIs in uplink for broadcast multicast services;

determining a corresponding relationship between a HARQ-ACK sub-codebook of each broadcast multicast service and each DAI in uplink;

determining the number of bits of the corresponding HARQ-ACK sub-codebooks, according to the corresponding relationship and scheduling signaling sent to a terminal for a broadcast multicast service; and/or sending the scheduling signaling for scheduling the broadcast multicast service to the terminal, to make the terminal determine the length of the corresponding HARQ-ACK sub-codebook according to the corresponding relationship and the scheduling signaling.

In one embodiment, the processor 803, when acquiring the number of DAIs in uplink for the broadcast multicast services, is configured to:

acquire the number of broadcast multicast services and a preset threshold value;

determine the number of DAIs in uplink according to the number of broadcast multicast services and the preset threshold value.

In one embodiment, the processor 803, when determining the number of DAIs in uplink according to the number of broadcast multicast services and the preset threshold value, is configured to:

if the number of broadcast multicast services is less than or equal to the preset threshold value, determine that the number of DAIs in uplink is equal to the number of broadcast multicast services; or if the number of broadcast multicast services is greater than the preset threshold value, determine that the number of DAIs in uplink is equal to the preset threshold value.

In one embodiment, the processor 803, when determining the number of DAIs in uplink according to the number of broadcast multicast services and the preset threshold value, is configured to:

acquire a ratio of the number of broadcast multicast services to the preset threshold value, round the ratio, and determine a rounded result as the number of DAIs in uplink.

In one embodiment, the processor 803, when acquiring the number of DAIs in uplink for the broadcast multicast services, is configured to:

acquire a preset value, and determine the preset value as the number of DAIs in uplink.

In one embodiment, the processor 803, when determining the corresponding relationship between the HARQ-ACK sub-codebook of each broadcast multicast service and each DAI in uplink, is configured to:

determine, according to an identifier G-RNTI of each broadcast multicast service, a corresponding relationship between each G-RNTI and each DAI in uplink;

determine a corresponding relationship between a HARQ-ACK sub-codebook of a broadcast multicast service corresponding to each G-RNTI and each DAI in uplink, according to the corresponding relationship between each G-RNTI and each DAI in uplink.

In one embodiment, when determining, according to the identifier G-RNTI of each broadcast multicast service, the corresponding relationship between each G-RNTI and each DAI in uplink, the processor 803 is configured to:

perform a modulo operation on each G-RNTI to the number of DAIs in uplink, determine G-RNTIs with a same modulo result as a G-RNTI group, and establish a corresponding relationship between the G-RNTI group and a DAI in uplink having a sequence number equal to the modulo result.

In one embodiment, when determining, according to the identifier G-RNTI of each broadcast multicast service, the corresponding relationship between each G-RNTI and each DAI in uplink, the processor 803 is configured to:

acquire high-layer signaling sent to the terminal, where the high-layer signaling includes a corresponding relationship between each G-RNTI and each DAI in uplink preset by the network device when pre-configuring the broadcast multicast service;

determine, according to the high-layer signaling, the corresponding relationship between each G-RNTI and each DAI in uplink.

In one embodiment, the processor 803 is further configured to:

if for any broadcast multicast service, the high-layer signaling does not include the corresponding relationship between the G-RNTI of the broadcast multicast service and each DAI in uplink, determine the length of the corresponding HARQ-ACK sub-codebook according to a DAI in downlink included in the scheduling signaling sent to the terminal for the broadcast multicast service.

In one embodiment, when determining, according to the identifier G-RNTI of each broadcast multicast service, the corresponding relationship between each G-RNTI and each DAI in uplink, the processor is configured to:

acquire scheduling signaling sent to the terminal for any one or more broadcast multicast services, where the scheduling signaling includes indication information, the indication information is used to indicate a DAI in uplink corresponding to a G-RNTI of one or more broadcast multicast services scheduled currently;

determine the corresponding relationship between each G-RNTI and each DAI in uplink according to the indication information of the scheduling signaling.

In one embodiment, the processor 803, when determining the corresponding relationship between each G-RNTI and each DAI in uplink according to the scheduling signaling, is configured to:

if for a same HARQ-ACK sub-codebook of any broadcast multicast service, plural pieces of scheduling signaling need to be sent to the terminal, and indication information in each piece of scheduling signaling indicates a different DAI in uplink corresponding to the G-RNTI of the one or more broadcast multicast services scheduled currently, determine a corresponding relationship between the G-RNTI of the one or more broadcast multicast services scheduled currently and the DAI in uplink, based on indication information of a last piece of scheduling signaling.

In one embodiment, the processor 803, when determining the corresponding relationship between each G-RNTI and each DAI in uplink according to the scheduling signaling, is configured to:

if the scheduling signaling does not indicate the DAI in uplink corresponding to the G-RNTI of the one or more broadcast multicast services scheduled currently, correspond the G-RNTI of the one or more broadcast multicast services scheduled currently to a default DAI in uplink; or the processor 803 is further configured to:

if the scheduling signaling does not indicate the DAI in uplink corresponding to the G-RNTI of the one or more broadcast multicast services scheduled currently, determine the length of the corresponding HARQ-ACK sub-codebook according to a DAI in downlink included in a last piece of scheduling signaling received for the broadcast multicast service.

In one embodiment, when determining, according to the identifier G-RNTI of each broadcast multicast service, the corresponding relationship between each G-RNTI and each DAI in uplink, the processor 803 is configured to:

acquire scheduling signaling sent to the terminal for the broadcast multicast service;

for one or more broadcast multicast services scheduled currently, establish a corresponding relationship between a G-RNTI of the one or more broadcast multicast services scheduled currently and each DAI in uplink sequentially in a predetermined order of the G-RNTI.

In one embodiment, the processor 803, when establishing the corresponding relationship between the G-RNTI of the one or more broadcast multicast services scheduled currently and each DAI in uplink sequentially in the predetermined order of G-RNTI, is configured to:

establish the corresponding relationship between the G-RNTI of the one or more broadcast multicast services scheduled currently and each DAI in uplink sequentially, in an ascending order or a descending order of the G-RNTI of the one or more broadcast multicast services scheduled currently.

In one embodiment, when determining the length of the corresponding HARQ-ACK sub-codebook, according to the corresponding relationship and the scheduling signaling sent to the terminal for the broadcast multicast service, the processor 803 is configured to:

determine a value of each DAI in uplink according to the corresponding relationship and uplink DAI information included in the scheduling signaling; determine, according to the value of each DAI in uplink, a length of a HARQ-ACK sub-codebook scheduled currently corresponding to each DAI in uplink.

In one embodiment, the processor 803, when determining, according to the value of each DAI in uplink, the length of the HARQ-ACK sub-codebook scheduled currently corresponding to each DAI in uplink, is configured to:

for any DAI in uplink, determine whether the terminal feeds back the corresponding HARQ-ACK sub-codebook, according to a value of the DAI in uplink and whether to send scheduling signaling for scheduling each broadcast multicast service corresponding to the DAI in uplink to the terminal;

if it is determined that the terminal does not feedback the corresponding HARQ-ACK sub-codebook, determine that the length of the corresponding HARQ-ACK sub-codebook scheduled currently is 0; or if it is determined that the terminal feeds back the corresponding HARQ-ACK sub-codebook, determine, according to the value of the DAI in uplink, the length of the corresponding HARQ-ACK sub-codebook scheduled currently.

In one embodiment, when determining the length of the corresponding HARQ-ACK sub-codebook, according to the corresponding relationship and the scheduling signaling sent to the terminal for the broadcast multicast service, the processor 803 is configured to:

if the scheduling signaling does not include uplink DAI information corresponding to the HARQ-ACK sub-codebook scheduled currently, determine, according to a DAI in downlink included in the scheduling signaling, the length of the HARQ-ACK sub-codebook scheduled currently.

In one embodiment, the processor 803 is further configured to:

determine a length of a HARQ-ACK codebook according to a length of each HARQ-ACK sub-codebook.

In one embodiment, the processor 803 is further configured to:

acquire network configuration, where the network configuration includes an identifier G-RNTI used for dynamic scheduling of a broadcast multicast service and/or an identifier G-CS-RNTI used for semi-static persistent group scheduling.

In one embodiment, if the network device configures the broadcast multicast service to support the semi-static persistent group scheduling, the network configuration includes one or more G-CS-RNTIs.

In one embodiment, the network configuration includes a G-CS-RNTI and a G-RNTI that are associated with each other; the processor 803 is further configured to:

for downlink group scheduling signaling, when G-RNTI configuration is dynamic HARQ codebook feedback, in corresponding scheduling signaling scrambled with the G-CS-RNTI and the associated G-RNTI, indicate that joint counting is used for a DAI in downlink; or for uplink unicast scheduling signaling, determine from the G-CS-RNTI and the associated G-RNTI, a DAI in uplink corresponding to the G-RNTI, to determine the length of the HARQ-ACK sub-codebook.

In one embodiment, the processor 803 is also configured to:

send high-layer signaling to the terminal, where the high-layer signaling includes an association relationship between the G-CS-RNTI and the G-RNTI that are associated with each other.

In one embodiment, the network configuration includes one or more G-CS-RNTIs; the processor 803 is further configured to:

for downlink group scheduling signaling, when G-RNTI configuration is dynamic HARQ codebook feedback, in corresponding G-CS-RNTI scheduling signaling, use separate counting for a DAI in downlink, determine, according to a DAI-related technical value, whether to generate the HARQ-ACK sub-codebook and the length of the sub-codebook; or for uplink unicast scheduling signaling, determine a corresponding DAI in uplink by using the G-CS-RNTI following a network device for the G-RNTI, to determine the length of the HARQ-ACK sub-codebook.

In one embodiment, the network configuration includes G-CS-RNTIs; the processor 803 is further configured to:

use separate DAI counting for each G-CS-RNT, or associate with a specific G-RNTI to use a joint DAI counting.

The network device provided by the embodiments of the present disclosure can be specifically configured to execute the network side method embodiments provided by the above embodiments, and the specific functions will not be repeated here.

Embodiment 10

Figure 10:
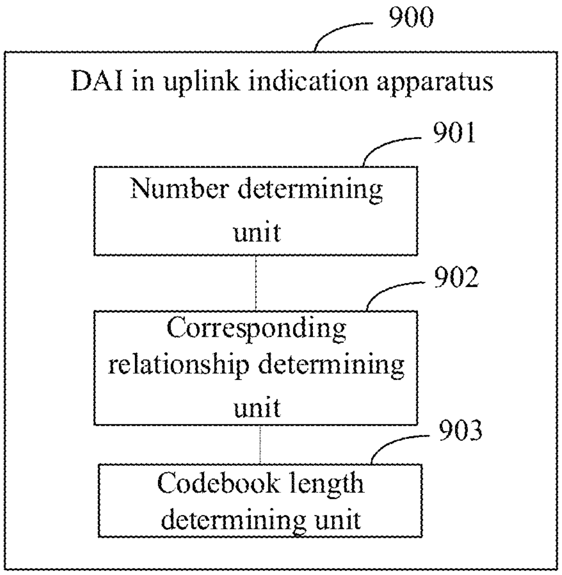
FIG. 10 is a structural diagram of a DAI in uplink indication apparatus provided by an embodiment of the present disclosure.

FIG. 10 is a structural diagram of a DAI in uplink indication apparatus provided by an embodiment of the present disclosure. The DAI in uplink indication apparatus provided by the embodiment can execute the processing flow provided by the method embodiment on the terminal device side. As shown in FIG. 10, the DAI in uplink indication apparatus 900 includes: a number determining unit 901, a corresponding relationship determining unit 902, a codebook length determining unit 903.

The number determining unit 901 is configured to acquire the number of DAIs in uplink configured by a network device for broadcast multicast services.

The corresponding relationship determining unit 902 is configured to determine a corresponding relationship between a HARQ-ACK sub-codebook of each broadcast multicast service and each DAI in uplink.

The codebook length determining unit 903 is configured to determine the number of bits of the corresponding HARQ-ACK sub-codebooks, according to the corresponding relationship and scheduling signaling received from the network device for a broadcast multicast service.

In one embodiment, the number determining unit 901, when acquiring the number of DAIs in uplink configured by the network device for the broadcast multicast services, is configured to:

acquire the number of broadcast multicast services and a preset threshold value configured by the network device;

determine the number of DAIs in uplink according to the number of broadcast multicast services and the preset threshold value.

In one embodiment, the number determining unit 901, when determining the number of DAIs in uplink according to the number of broadcast multicast services and the preset threshold value, is configured to:

if the number of broadcast multicast services is less than or equal to the preset threshold value, determine that the number of DAIs in uplink is equal to the number of broadcast multicast services; or if the number of broadcast multicast services is greater than the preset threshold value, determine that the number of DAIs in uplink is equal to the preset threshold value.

In one embodiment, the number determining unit 901, when determining the number of DAIs in uplink according to the number of broadcast multicast services and the preset threshold value, is configured to:

acquire a ratio of the number of broadcast multicast services to the preset threshold value, round the ratio, and determine a rounded result as the number of DAIs in uplink.

In one embodiment, the number determining unit 901, when acquiring the number of DAIs in uplink preset by the network device for the broadcast multicast service, is configured to:

acquire a preset value configured by the network device, and determine the preset value as the number of DAIs in uplink.

In one embodiment, the corresponding relationship determining unit 902, when determining the corresponding relationship between the HARQ-ACK sub-codebook of each broadcast multicast service and each DAI in uplink, is configured to:

determine, according to an identifier G-RNTI of each broadcast multicast service, a corresponding relationship between each G-RNTI and each DAI in uplink;

determine a corresponding relationship between a HARQ-ACK sub-codebook of a broadcast multicast service corresponding to each G-RNTI and each DAI in uplink, according to the corresponding relationship between each G-RNTI and each DAI in uplink.

In one embodiment, when determining, according to the identifier G-RNTI of each broadcast multicast service, the corresponding relationship between each G-RNTI and each DAI in uplink, the corresponding relationship determining unit 902 is configured to:

perform a modulo operation on each G-RNTI to the number of DAIs in uplink, determine G-RNTIs with a same modulo result as a G-RNTI group, and establish a corresponding relationship between the G-RNTI group and a DAI in uplink having a sequence number equal to the modulo result.

In one embodiment, when determining, according to the identifier G-RNTI of each broadcast multicast service, the corresponding relationship between each G-RNTI and each DAI in uplink, the corresponding relationship determining unit 902 is configured to:

determine the corresponding relationship between each G-RNTI and each DAI in uplink according to high-layer signaling sent by the network device received in advance, where the high-layer signaling includes the corresponding relationship between each G-RNTI and each DAI in uplink preset by the network device when pre-configuring the broadcast multicast service.

In one embodiment, the corresponding relationship determining unit 902 is further configured to:

if for any broadcast multicast service, the high-layer signaling does not include the corresponding relationship between the G-RNTI of the broadcast multicast service and each DAI in uplink, control the codebook length determining unit 903 to determine the length of the corresponding HARQ-ACK sub-codebook according to a DAI in downlink included in a last piece of scheduling signaling received for the broadcast multicast service.

In one embodiment, when determining, according to the identifier G-RNTI of each broadcast multicast service, the corresponding relationship between each G-RNTI and each DAI in uplink, the corresponding relationship determining unit 902 is configured to:

receive scheduling signaling sent by the network device for any one or more broadcast multicast services, where the scheduling signaling includes indication information, the indication information is used to indicate a DAI in uplink corresponding to a G-RNTI of one or more broadcast multicast services scheduled currently;

determine the corresponding relationship between each G-RNTI and each DAI in uplink according to the indication information of the scheduling signaling.

In one embodiment, the corresponding relationship determining unit 902, when determining the corresponding relationship between each G-RNTI and each DAI in uplink according to the scheduling signaling, is configured to:

if for a same HARQ-ACK sub-codebook of any broadcast multicast service, plural pieces of scheduling signaling sent by the network device are received, and indication information in each piece of scheduling signaling indicates a different DAI in uplink corresponding to the G-RNTI of the one or more broadcast multicast services scheduled currently, determine a corresponding relationship between the G-RNTI of the one or more broadcast multicast services scheduled currently and the DAI in uplink, based on indication information of a last piece of scheduling signaling.

In one embodiment, the corresponding relationship determining unit 902, when determining the corresponding relationship between each G-RNTI and each DAI in uplink according to the scheduling signaling, is configured to:

if the scheduling signaling does not indicate the DAI in uplink corresponding to the G-RNTI of the one or more broadcast multicast services scheduled currently, correspond the G-RNTI of the one or more broadcast multicast services scheduled currently to a default DAI in uplink; or where the corresponding relationship determining unit 902 is further configured to:

if the scheduling signaling does not indicate the DAI in uplink corresponding to the G-RNTI of the one or more broadcast multicast services scheduled currently, determine the length of the corresponding HARQ-ACK sub-codebook according to a DAI in downlink included in a last piece of scheduling signaling received for the broadcast multicast service.

In one embodiment, when determining, according to the identifier G-RNTI of each broadcast multicast service, the corresponding relationship between each G-RNTI and each DAI in uplink, the corresponding relationship determining unit 902 is configured to:

receive scheduling signaling sent by the network device for the broadcast multicast service;

for one or more broadcast multicast services scheduled currently, establish a corresponding relationship between a G-RNTI of the one or more broadcast multicast services scheduled currently and each DAI in uplink sequentially in a predetermined order of the G-RNTI.

In one embodiment, the corresponding relationship determining unit 902, when establishing the corresponding relationship between the G-RNTI of the one or more broadcast multicast services scheduled currently and each DAI in uplink sequentially in the predetermined order of G-RNTI, is configured to:

establish the corresponding relationship between the G-RNTI of the one or more broadcast multicast services scheduled currently and each DAI in uplink sequentially, in an ascending order or a descending order of the G-RNTI of the one or more broadcast multicast services scheduled currently.

In one embodiment, the codebook length determining unit 903, when determining the length of the corresponding HARQ-ACK sub-codebook according to the corresponding relationship and the scheduling signaling received from the network device for the broadcast multicast service, is configured to:

determine a value of each DAI in uplink according to the corresponding relationship and uplink DAI information included in the scheduling signaling;

determine, according to the value of each DAI in uplink, a length of a HARQ-ACK sub-codebook scheduled currently corresponding to each DAI in uplink.

In one embodiment, the codebook length determining unit 903, when determining, according to the value of each DAI in uplink, the length of the HARQ-ACK sub-codebook scheduled currently corresponding to each DAI in uplink, is configured to:

for any DAI in uplink, determine whether to feedback the corresponding HARQ-ACK sub-codebook, according to a value of the DAI in uplink and whether scheduling signaling for scheduling each broadcast multicast service corresponding to the DAI in uplink is received;

if it is determined not to feedback the corresponding HARQ-ACK sub-codebook, determine that the length of the corresponding HARQ-ACK sub-codebook scheduled currently is 0; or if it is determined to feedback the corresponding HARQ-ACK sub-codebook, determine, according to the value of the DAI in uplink, the length of the corresponding HARQ-ACK sub-codebook scheduled currently.

In one embodiment, the codebook length determining unit 903, when determining the length of the corresponding HARQ-ACK sub-codebook according to the corresponding relationship and the scheduling signaling received from the network device for the broadcast multicast service, is configured to:

if the scheduling signaling does not include uplink DAI information corresponding to the HARQ-ACK sub-codebook scheduled currently, determine, according to a DAI in downlink included in the scheduling signaling, the length of the HARQ-ACK sub-codebook scheduled currently.

In one embodiment, the codebook length determining unit 903 is further configured to:

determine a length of a HARQ-ACK codebook according to a length of each HARQ-ACK sub-codebook.

The DAI in uplink indication apparatus provided by the embodiments of the present disclosure can be specifically configured to execute the method embodiments on the terminal side, and the specific functions will not be repeated here.

Embodiment 11

Figure 11:
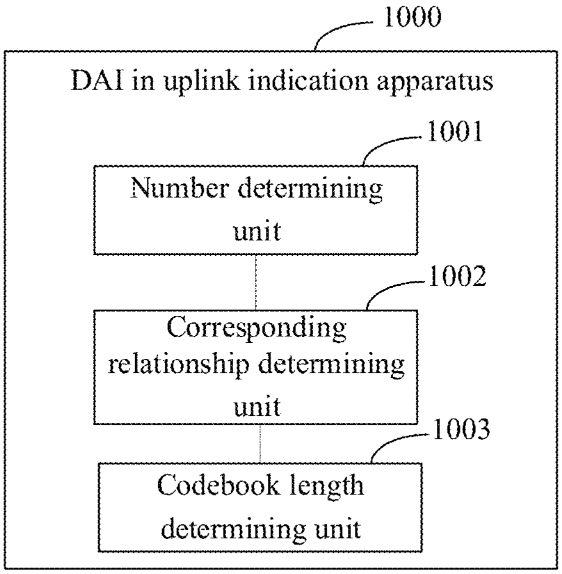
FIG. 11 is a structural diagram of a DAI in uplink indication apparatus provided by another embodiment of the present disclosure.

FIG. 11 is a structural diagram of a DAI in uplink indication apparatus provided by an embodiment of the present disclosure. The DAI in uplink indication apparatus provided by the embodiment can execute the processing flow provided by the method embodiment on the network device side. As shown in FIG. 11, the DAI in uplink indication apparatus 1000 includes: a number determining unit 1001, a corresponding relationship determining unit 1002, a codebook length determining unit 1003.

The number determining unit 1001 is configured to acquire the number of DAIs in uplink for broadcast multicast services.

The corresponding relationship determining unit 1002 is configured to determine a corresponding relationship between a HARQ-ACK sub-codebook of each broadcast multicast service and each DAI in uplink.

The codebook length determining unit 1003 is configured to determine a length of a corresponding HARQ-ACK sub-codebook, according to the corresponding relationship and scheduling signaling sent to a terminal for a broadcast multicast service; and/or send the scheduling signaling for scheduling the broadcast multicast service to the terminal, to make the terminal determine the length of the corresponding HARQ-ACK sub-codebook according to the corresponding relationship and the scheduling signaling.

In one embodiment, the number determining unit 1001, when acquiring the number of DAIs in uplink for the broadcast multicast services, is configured to:

acquire the number of broadcast multicast services and a preset threshold value;

determine the number of DAIs in uplink according to the number of broadcast multicast services and the preset threshold value.

In one embodiment, the number determining unit 1001, when determining the number of DAIs in uplink according to the number of broadcast multicast services and the preset threshold value, is configured to:

if the number of broadcast multicast services is less than or equal to the preset threshold value, determine that the number of DAIs in uplink is equal to the number of broadcast multicast services; or if the number of broadcast multicast services is greater than the preset threshold value, determine that the number of DAIs in uplink is equal to the preset threshold value.

In one embodiment, the number determining unit 1001, when determining the number of DAIs in uplink according to the number of broadcast multicast services and the preset threshold value, is configured to:

acquire a ratio of the number of broadcast multicast services to the preset threshold value, round the ratio, and determine a rounded result as the number of DAIs in uplink.

In one embodiment, the number determining unit 1001, when acquiring the number of DAIs in uplink for the broadcast multicast services, is configured to:

acquire a preset value, and determine the preset value as the number of DAIs in uplink.

In one embodiment, the corresponding relationship determining unit 1002, when determining the corresponding relationship between the HARQ-ACK sub-codebook of each broadcast multicast service and each DAI in uplink, is configured to:

determine, according to an identifier G-RNTI of each broadcast multicast service, a corresponding relationship between each G-RNTI and each DAI in uplink;

determine a corresponding relationship between a HARQ-ACK sub-codebook of a broadcast multicast service corresponding to each G-RNTI and each DAI in uplink, according to the corresponding relationship between each G-RNTI and each DAI in uplink.

In one embodiment, when determining, according to the identifier G-RNTI of each broadcast multicast service, the corresponding relationship between each G-RNTI and each DAI in uplink, the corresponding relationship determining unit 1002 is configured to:

perform a modulo operation on each G-RNTI to the number of DAIs in uplink, determine G-RNTIs with a same modulo result as a G-RNTI group, and establish a corresponding relationship between the G-RNTI group and a DAI in uplink having a sequence number equal to the modulo result.

In one embodiment, when determining, according to the identifier G-RNTI of each broadcast multicast service, the corresponding relationship between each G-RNTI and each DAI in uplink, the corresponding relationship determining unit 1002 is configured to:

acquire high-layer signaling sent to the terminal, where the high-layer signaling includes a corresponding relationship between each G-RNTI and each DAI in uplink preset by the network device when pre-configuring the broadcast multicast service;

determine the corresponding relationship between each G-RNTI and each DAI in uplink according to the high-layer signaling.

In one embodiment, the corresponding relationship determining unit 1002 is further configured to:

if for any broadcast multicast service, the high-layer signaling does not include the corresponding relationship between the G-RNTI of the broadcast multicast service and each DAI in uplink, control the codebook length determining unit 1003 to determine the length of the corresponding HARQ-ACK sub-codebook according to a DAI in downlink included in the scheduling signaling sent to the terminal for the broadcast multicast service.

In one embodiment, when determining, according to the identifier G-RNTI of each broadcast multicast service, the corresponding relationship between each G-RNTI and each DAI in uplink, the corresponding relationship determining unit 1002 is configured to:

acquire scheduling signaling sent to the terminal for any one or more broadcast multicast services, where the scheduling signaling includes indication information, the indication information is used to indicate a DAI in uplink corresponding to a G-RNTI of one or more broadcast multicast services scheduled currently;

determine the corresponding relationship between each G-RNTI and each DAI in uplink according to the indication information of the scheduling signaling.

In one embodiment, the corresponding relationship determining unit 1002, when determining the corresponding relationship between each G-RNTI and each DAI in uplink according to the scheduling signaling, is configured to:

if for a same HARQ-ACK sub-codebook of any broadcast multicast service, plural pieces of scheduling signaling need to be sent to the terminal, and indication information in each piece of scheduling signaling indicates a different DAI in uplink corresponding to the G-RNTI of the one or more broadcast multicast services scheduled currently, determine a corresponding relationship between the G-RNTI of the one or more broadcast multicast services scheduled currently and the DAI in uplink, based on indication information of a last piece of scheduling signaling.

In one embodiment, the corresponding relationship determining unit 1002, when determining the corresponding relationship between each G-RNTI and each DAI in uplink according to the scheduling signaling, is configured to:

if the scheduling signaling does not indicate the DAI in uplink corresponding to the G-RNTI of the one or more broadcast multicast services scheduled currently, correspond the G-RNTI of the one or more broadcast multicast services scheduled currently to a default DAI in uplink; or where the corresponding relationship determining unit 1002:

if the scheduling signaling does not indicate the DAI in uplink corresponding to the G-RNTI of the one or more broadcast multicast services scheduled currently, determine the length of the corresponding HARQ-ACK sub-codebook according to a DAI in downlink included in a last piece of scheduling signaling received for the broadcast multicast service.

In one embodiment, when determining, according to the identifier G-RNTI of each broadcast multicast service, the corresponding relationship between each G-RNTI and each DAI in uplink, the corresponding relationship determining unit 1002 is configured to:

acquire scheduling signaling sent to the terminal for the broadcast multicast service;

for one or more broadcast multicast services scheduled currently, establish a corresponding relationship between a G-RNTI of the one or more broadcast multicast services scheduled currently and each DAI in uplink sequentially in a predetermined order of the G-RNTI.

In one embodiment, the corresponding relationship determining unit 1002, when establishing the corresponding relationship between the G-RNTI of the one or more broadcast multicast services scheduled currently and each DAI in uplink sequentially in the predetermined order of G-RNTI, is configured to:

establish the corresponding relationship between the G-RNTI of the one or more broadcast multicast services scheduled currently and each DAI in uplink sequentially, in an ascending order or a descending order of the G-RNTI of the one or more broadcast multicast services scheduled currently.

In one embodiment, when determining the length of the corresponding HARQ-ACK sub-codebook, according to the corresponding relationship and the scheduling signaling sent to the terminal for the broadcast multicast service, the codebook length determining unit 1003 is configured to:

determine a value of each DAI in uplink according to the corresponding relationship and uplink DAI information included in the scheduling signaling;

determine, according to the value of each DAI in uplink, a length of a HARQ-ACK sub-codebook scheduled currently corresponding to each DAI in uplink.

In one embodiment, the codebook length determining unit 1003, when determining, according to the value of each DAI in uplink, the length of the HARQ-ACK sub-codebook scheduled currently corresponding to each DAI in uplink, is configured to:

for any DAI in uplink, determine whether the terminal feeds back the corresponding HARQ-ACK sub-codebook, according to a value of the DAI in uplink and whether to send scheduling signaling for scheduling each broadcast multicast service corresponding to the DAI in uplink to the terminal;

if it is determined that the terminal does not feedback the corresponding HARQ-ACK sub-codebook, determine that the length of the corresponding HARQ-ACK sub-codebook scheduled currently is 0; or if it is determined that the terminal feeds back the corresponding HARQ-ACK sub-codebook, determine, according to the value of the DAI in uplink, the length of the corresponding HARQ-ACK sub-codebook scheduled currently.

In one embodiment, when determining the length of the corresponding HARQ-ACK sub-codebook, according to the corresponding relationship and the scheduling signaling sent to the terminal for the broadcast multicast service, the codebook length determining unit 1003 is configured to:

if the scheduling signaling does not include uplink DAI information corresponding to the HARQ-ACK sub-codebook scheduled currently, determine, according to a DAI in downlink included in the scheduling signaling, the length of the HARQ-ACK sub-codebook scheduled currently.

In one embodiment, the codebook length determining unit 1003 is further configured to:

determine a length of a HARQ-ACK codebook according to a length of each HARQ-ACK sub-codebook.

It should be noted that, the division of units in the embodiment of the present disclosure is schematic, and is only a logical function division, and there may be other division manners in actual implementation. In addition, each functional unit in each embodiment of the present disclosure may be integrated in a single processing unit, or each unit may be physically present separately, or two or more units may be integrated in a single unit. The above integrated units can be implemented either in the form of hardware or in the form of software functional units.

The integrated units may be stored in a processor-readable storage medium when implemented in the form of software function units and sold or used as an independent product. Based on this understanding, the embodiment of the present disclosure is essentially, or the part which makes contribution to the prior art, or all or part of the embodiments can be embodied in the form of a software product. The computer software product may be stored in a storage medium, including several instructions for enabling a computer device (which may be a personal computer, a server, or a network device, etc.) or a processor to execute all or part of the steps of the methods in the various embodiments of the present disclosure. The aforementioned storage media includes: a U disk, a mobile hard disk, a read-only memory (ROM), a random access memory (RAM), a magnetic disk or an optical disk and other medium that can store program codes.

It should be noted herein that, the above apparatus provided in the present disclosure is capable of implementing all the method steps achieved by the above method embodiment, and is capable of achieving the same effect, and the same parts and beneficial effects of the present embodiment as those in the method embodiment will not be described in detail herein.

Embodiment 12

Embodiment 11 of the present disclosure provides a computer-readable storage medium having a computer program stored thereon, and the computer program is used to cause the processor to execute the DAI in uplink indication method provided by any one of Embodiment 1 to Embodiment 6.

The computer-readable storage medium may be any available medium or data storage device that can be accessed by the processor, including but not limited to a magnetic storage (such as a floppy disk, a hard disk, a magnetic tape, a magneto-optical disk (MO), etc.), an optical storage (such as CD, DVD, BD, HVD, etc.), and a semiconductor storage (such as ROM, EPROM, EEPROM, a non-volatile memory (NAND FLASH), a solid state disk (SSD)), etc.

Embodiment 13

Embodiment 11 of the present disclosure provides a computer-readable storage medium having a computer program stored thereon, and the computer program is used to cause the processor to execute the DAI in uplink indication method provided in Embodiment 7.

The computer-readable storage medium may be any available medium or data storage device that can be accessed by the processor, including but not limited to a magnetic storage (such as a floppy disk, a hard disk, a magnetic tape, a magneto-optical disk (MO), etc.), an optical storage (such as CD, DVD, BD, HVD, etc.), and a semiconductor storage (such as ROM, EPROM, EEPROM, a non-volatile memory (NAND FLASH), a solid state disk (SSD)), etc.

Embodiments of the present disclosure may be provided as methods, systems, or computer program products. Accordingly, the present disclosure may take the form of an entirely hardware embodiment, an entirely software embodiment or an embodiment combining software and hardware aspects. The present disclosure may take the form of a computer program product embodied on one or more computer-usable storage mediums (including but not limited to a disk storage and an optical storage, etc.) having a computer-usable program code stored thereon.

The present disclosure is described with reference to flowcharts and/or block diagrams of methods, devices (systems), and computer program products according to the embodiments of the present disclosure. It should be understood that each procedure and/or block in the flowchart and/or block diagrams, and combinations of procedures and/or blocks in the flowchart and/or block diagrams can be implemented by the computer-executable instruction. These computer-executable instructions may be provided to a processor of a general-purpose computer, a specialized computer, an embedded processor, or other programmable data processor to produce a machine, and an apparatus for implementing a function specified in one or more processes of the flowchart and/or one or more blocks of the block diagram may be produced via the instructions executed by the processor of the computer or other programmable data processor.

These processor-executable instructions may also be stored in a processor-readable memory capable of directing a computer or other programmable data processors to operate in a specific manner, and the instructions stored in the processor-readable memory produce a manufacturing product including an instruction apparatus, where the instruction apparatus realizes the function specified in one or more procedures of the flow chart and/or one or more blocks of the block diagram.

These processor-executable instructions may also be loaded onto a computer or other programmable data processing device, and a series of operational steps may be performed on the computer or other programmable device to produce computer-implemented processing. Therefore, the instructions executed on the computer or other programmable device provide steps for implementing the functions specified in one or more processes of the flowchart and/or one or more blocks of the block diagram.

The invention claimed is:

1. A downlink assignment index (DAI) in uplink indication method, applied to a terminal, comprising:

acquiring network configuration, wherein the network configuration comprises a group common radio network temporary identifier (G-RNTI) used for dynamic scheduling of a broadcast multicast service and/or a group configured scheduling-RNTI (G-CS-RNTI) used for semi-static persistent group scheduling;

when a network device configures the broadcast multicast service supporting the semi-static persistent group scheduling, the network configuration comprises one or more G-CS-RNTIs;

for downlink group scheduling signaling, when G-CS-RNTI configuration is dynamic hybrid automatic repeat request (HARQ) codebook feedback, in corresponding G-CS-RNTI scheduling signaling, using separate counting for a DAI in downlink, generating, according to a DAI-related technical value, a hybrid automatic repeat request-acknowledgment (HARQ-ACK) sub-codebook and a number of bits of the sub-codebook; or for uplink unicast scheduling signaling, determining a corresponding DAI in uplink by using the G-CS-RNTI following a method for the G-RNTI, to determine a number of bits of the HARQ-ACK sub-codebook.

2. The method according to claim 1, wherein the for uplink unicast scheduling signaling, determining the corresponding DAI in uplink by using the G-CS-RNTI following a method for the G-RNTI, to determine the number of bits of the HARQ-ACK sub-codebook comprises:

determining whether to feedback a corresponding HARQ-ACK sub-codebook, according to a value of the DAI in uplink and whether scheduling signaling for scheduling each broadcast multicast service corresponding to the DAI in uplink is received;

when it is determined not to feedback the corresponding HARQ-ACK sub-codebook, determining that the number of bits of the corresponding HARQ-ACK sub-codebook scheduled currently is 0; or when it is determined to feedback the corresponding HARQ-ACK sub-codebook, determining, according to the value of the DAI in uplink, the number of bits of the corresponding HARQ-ACK sub-codebook of scheduled broadcast multicast service currently.

3. A downlink assignment index (DAI) in uplink indication method, applied to a network device, comprising:

acquiring network configuration, wherein the network configuration comprises a group common radio network temporary identifier (G-RNTI) used for dynamic scheduling of a broadcast multicast service and/or a group configured scheduling-RNTI (G-CS-RNTI) used for semi-static persistent group scheduling;

when the network device configures the broadcast multicast service supporting the semi-static persistent group scheduling, the network configuration comprises one or more G-CS-RNTIs;

for downlink group scheduling signaling, when G-CS-RNTI configuration is dynamic hybrid automatic repeat request (HARQ) codebook feedback, in corresponding G-CS-RNTI scheduling signaling, using separate counting for a DAI in downlink, generating, according to a DAI-related technical value, a hybrid automatic repeat request-acknowledgment (HARQ-ACK) sub-codebook and a number of bits of the sub-codebook; or for uplink unicast scheduling signaling, determining a corresponding DAI in uplink by using the G-CS-RNTI following a method for the G-RNTI, to determine a number of bits of the HARQ-ACK sub-codebook.

4. A terminal, comprising: a memory, a transceiver and a processor:

wherein the memory is configured to store a computer program; the transceiver is configured to send and receive data under control of the processor; and the processor is configured to read the computer program in the memory and execute following operations:

acquiring network configuration, wherein the network configuration comprises a group common radio network temporary identifier (G-RNTI) used for dynamic scheduling of a broadcast multicast service and/or a group configured scheduling-RNTI (G-CS-RNTI) used for semi-static persistent group scheduling;

when a network device configures the broadcast multicast service supporting the semi-static persistent group scheduling, the network configuration comprises one or more G-CS-RNTIs;

for downlink group scheduling signaling, when G-CS-RNTI configuration is dynamic hybrid automatic repeat request (HARQ) codebook feedback, in corresponding G-CS-RNTI scheduling signaling, using separate counting for a DAI in downlink, generating, according to a DAI-related technical value, a hybrid automatic repeat request-acknowledgment (HARQ-ACK) sub-codebook and a number of bits of the sub-codebook; or for uplink unicast scheduling signaling, determining a corresponding DAI in uplink by using the G-CS-RNTI following a method for the G-RNTI, to determine a number of bits of the HARQ-ACK sub-codebook.

5. A network device, comprising: a memory, a transceiver, and a processor:

wherein the memory is configured to store a computer program; the transceiver is configured to send and receive data under control of the processor; and the processor is configured to read the computer program in the memory and execute the method according to claim 3.

6. A non-transitory processor-readable storage medium having a computer program stored thereon, wherein the computer program is used to cause a processor to execute the method according to claim 1.

7. The method according to claim 1, further comprising:

determining an association relationship between the G-CS-RNTI and the G-RNTI that are associated with each other according to high-layer signaling sent by the network device.

8. The method according to claim 3, further comprising:
sending high-layer signaling to a terminal, wherein the high-layer signaling comprises an association relationship between the G-CS-RNTI and the G-RNTI that are associated with each other.

9. The method according to claim 3, wherein the for uplink unicast scheduling signaling, determining the corresponding DAI in uplink by using the G-CS-RNTI following a method for the G-RNTI, to determine the number of bits of the HARQ-ACK sub-codebook comprises:
determining whether the terminal feeds back a corresponding HARQ-ACK sub-codebook, according to a value of the DAI in uplink and whether to send scheduling signaling for scheduling each broadcast multicast service corresponding to the DAI in uplink to the terminal;
when it is determined that the terminal does not feedback the corresponding HARQ-ACK sub-codebook, determining that the length of the corresponding HARQ-ACK sub-codebook scheduled currently is 0; or, when it is determined that the terminal feeds back the corresponding HARQ-ACK sub-codebook, determining, according to the value of the DAI in uplink, the length of the corresponding HARQ-ACK sub-codebook scheduled currently.

10. The terminal according to claim 4, wherein the processor is further configured to:

determine an association relationship between the G-CS-RNTI and the G-RNTI that are associated with each other according to high-layer signaling sent by the network device.

11. The terminal according to claim 4, wherein the processor is further configured to:
determine whether to feedback a corresponding HARQ-ACK sub-codebook, according to a value of the DAI in uplink and whether scheduling signaling for scheduling each broadcast multicast service corresponding to the DAI in uplink is received;
when it is determined not to feedback the corresponding HARQ-ACK sub-codebook, determine that the number of bits of the corresponding HARQ-ACK sub-codebook scheduled currently is 0; or, when it is determined to feedback the corresponding HARQ-ACK sub-codebook, determine, according to the value of the DAI in uplink, the number of bits of the corresponding HARQ-ACK sub-codebook of scheduled broadcast multicast service currently.

12. A non-transitory processor-readable storage medium having a computer program stored thereon, wherein the computer program is used to cause a processor to execute the method according to claim 3.

* * * * *